US010162592B2

(12) United States Patent
Eronen et al.

(10) Patent No.: US 10,162,592 B2
(45) Date of Patent: Dec. 25, 2018

(54) DETERMINING A REPRESENTATION OF AN IMAGE AND CAUSING DISPLAY OF THE REPRESENTATION BY A BEAD APPARATUS

(71) Applicant: Nokia Technologies Oy, Espoo (FI)

(72) Inventors: Antti Eronen, Tampere (FI); Arto Lehtiniemi, Lempäälä (FI); Juha Arrasvuori, Tampere (FI); Jukka Holm, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/030,748

(22) PCT Filed: Oct. 28, 2013

(86) PCT No.: PCT/FI2013/051017
§ 371 (c)(1),
(2) Date: Apr. 20, 2016

(87) PCT Pub. No.: WO2015/063363
PCT Pub. Date: May 7, 2015

(65) Prior Publication Data
US 2016/0266858 A1    Sep. 15, 2016

(51) Int. Cl.
*G09G 5/00* (2006.01)
*G06F 3/14* (2006.01)
(Continued)

(52) U.S. Cl.
CPC .......... *G06F 3/1446* (2013.01); *G06F 1/163* (2013.01); *G06F 1/1637* (2013.01);
(Continued)

(58) Field of Classification Search
CPC ...... G06F 1/163; G06F 1/1637; G06F 1/1641; G06F 1/1649; G06F 3/1423;
(Continued)

(56) References Cited

U.S. PATENT DOCUMENTS 5,757,929 A   5/1998  Wang et al.
6,216,490 B1  4/2001  Radley-Smith
(Continued)

FOREIGN PATENT DOCUMENTS

CN   102077161 A    5/2011
CN   102722323      10/2012
(Continued)

OTHER PUBLICATIONS

"Touch Screen Bracelet Tells You Weather and Reads Texys" by PSFK, Nov. 1, 2012, 3 pages.*
(Continued)

*Primary Examiner* — Joe H Cheng
(74) *Attorney, Agent, or Firm* — Alston & Bird LLP

(57) ABSTRACT

A method comprising receiving a representation of an image (702), the image being based, at least in part, on at least one operational circumstance, determining a first part of the representation based, at least in part, on a position of a first bead apparatus (704), causing display of the first part of the representation by the first bead apparatus (706), determining a second part of the representation based, at least in part, on a position of a second bead apparatus (708), and causing display of, at least a portion of, the second part of the representation by the second bead apparatus (710) is disclosed.

20 Claims, 13 Drawing Sheets

(51) Int. Cl.
*G06F 1/16* (2006.01)
*H04W 4/02* (2018.01)
*G06Q 30/06* (2012.01)

(52) U.S. Cl.
CPC ....... *G06F 1/1694* (2013.01); *G06Q 30/0643* (2013.01); *H04W 4/026* (2013.01); *G09G 2356/00* (2013.01)

(58) Field of Classification Search
CPC ... G06F 3/1446; G06F 3/147; G09G 2354/00; G09G 2380/02; G06Q 30/0643; H04M 1/0206; H04M 1/0247; H04M 2250/16
See application file for complete search history.

(56) References Cited

U.S. PATENT DOCUMENTS

| | | | |
|---|---|---|---|
| 6,920,606 B1* | 7/2005 | Jablonski | G06Q 30/02 345/619 |
| 8,098,141 B2 | 1/2012 | Vanska et al. | |
| 8,872,729 B2* | 10/2014 | Lyons | G04G 17/083 345/1.1 |
| 9,122,249 B2 | 9/2015 | Lyons et al. | |
| 9,696,690 B2 | 7/2017 | Nguyen et al. | |
| 2003/0030595 A1* | 2/2003 | Radley-Smith | A44C 5/0007 345/1.3 |
| 2005/0052852 A1 | 3/2005 | Ono | |
| 2005/0113081 A1 | 5/2005 | Tushinsky et al. | |
| 2005/0132290 A1 | 6/2005 | Buchner et al. | |
| 2005/0174302 A1 | 8/2005 | Ishii | |
| 2007/0075915 A1 | 4/2007 | Cheon et al. | |
| 2007/0279852 A1 | 12/2007 | Daniel et al. | |
| 2008/0001764 A1 | 1/2008 | Douglas et al. | |
| 2008/0318636 A1* | 12/2008 | Kim | G06F 1/163 455/566 |
| 2009/0104931 A1* | 4/2009 | Chiang | H04M 1/0254 455/575.3 |
| 2009/0251419 A1 | 10/2009 | Radely-Smith | |
| 2009/0273560 A1 | 11/2009 | Kalanithi et al. | |
| 2010/0004037 A1* | 1/2010 | Ozawa | G06F 1/1616 455/575.3 |
| 2010/0029327 A1* | 2/2010 | Jee | G04G 17/045 455/556.1 |
| 2010/0064536 A1* | 3/2010 | Caskey | G06F 1/1616 33/303 |
| 2010/0217667 A1* | 8/2010 | Mo, II | G06Q 30/02 705/14.51 |
| 2010/0228691 A1 | 9/2010 | Yang et al. | |
| 2011/0059769 A1 | 3/2011 | Brunolli | |
| 2011/0102354 A1 | 5/2011 | Fuyuno et al. | |
| 2011/0157022 A1 | 6/2011 | Goldburt | |
| 2011/0193805 A1 | 8/2011 | Park et al. | |
| 2011/0209102 A1 | 8/2011 | Hinckley et al. | |
| 2011/0291964 A1 | 12/2011 | Chambers et al. | |
| 2012/0021684 A1 | 1/2012 | Schultz et al. | |
| 2012/0075173 A1 | 3/2012 | Ashbrook et al. | |
| 2012/0242596 A1 | 9/2012 | Sip | |
| 2013/0024805 A1 | 1/2013 | In et al. | |
| 2013/0044215 A1 | 2/2013 | Rothkopf et al. | |
| 2013/0173658 A1 | 7/2013 | Adelman et al. | |
| 2013/0222270 A1* | 8/2013 | Winkler | H04M 1/0233 345/173 |
| 2013/0222271 A1 | 8/2013 | Alberth et al. | |
| 2013/0271350 A1 | 10/2013 | Lyons | |
| 2013/0271355 A1* | 10/2013 | Lyons | G04G 17/083 345/1.3 |
| 2013/0271389 A1* | 10/2013 | Lyons | G04G 17/083 345/173 |
| 2013/0271390 A1* | 10/2013 | Lyons | G04G 17/083 345/173 |
| 2013/0271392 A1* | 10/2013 | Lyons | G04G 17/083 345/173 |
| 2013/0271495 A1* | 10/2013 | Nguyen | G04G 17/083 345/649 |
| 2014/0047379 A1 | 2/2014 | Urawaki et al. | |
| 2014/0172548 A1 | 6/2014 | Garlick | |
| 2014/0281956 A1 | 9/2014 | Anderson et al. | |
| 2015/0185884 A1 | 7/2015 | Magi | |
| 2015/0258458 A1* | 9/2015 | Zhang | A63F 13/95 463/40 |
| 2016/0239182 A1* | 8/2016 | Eronen | G06F 17/30038 |
| 2016/0266660 A1* | 9/2016 | Eronen | G06F 3/14 |

FOREIGN PATENT DOCUMENTS

| | | | | |
|---|---|---|---|---|
| CN | 102891925 | | 1/2013 | |
| EP | 1 259 135 A1 | | 11/2002 | |
| EP | 1 311 126 A2 | | 5/2003 | |
| EP | 1 259 135 B1 | | 9/2006 | |
| EP | 1 754 424 A1 | | 2/2007 | |
| EP | 1 998 260 A1 | | 12/2008 | |
| EP | 2 154 662 A2 | | 2/2010 | |
| EP | 2 368 455 A1 | | 9/2011 | |
| EP | 2 372 984 A | | 10/2011 | |
| EP | 2 474 168 A2 | | 7/2012 | |
| EP | 2 549 480 A1 | | 1/2013 | |
| GB | 2411552 A | * | 8/2005 | ........... A44C 5/0007 |
| JP | 2001 125722 A | | 5/2001 | |
| KR | 2011-0067849 A | | 6/2011 | |
| WO | WO 01/064070 A1 | | 9/2001 | |
| WO | WO 2011/029098 A2 | | 3/2011 | |
| WO | WO 2012/108668 A2 | | 8/2012 | |
| WO | WO 2014/202490 A1 | | 12/2014 | |
| WO | WO 2015/063361 A1 | | 5/2015 | |
| WO | WO 2015/063362 A1 | | 5/2015 | |

OTHER PUBLICATIONS

International Search Report and Written Opinion received for corresponding Patent Cooperation Treaty Application No. PCT/FI2013/051017, dated Aug. 28, 2014, 14 pages.
"Leaked Footage: Nokia's Facet smartwatch concept", Oct. 17, 2013, retrieved from the Internet: URL:https:/www.youtube.com/watch?v=Bxn_N4vHqXQ, 1 page.
Kent Lyons et al. "Facet: A Multi-Segment Wrist Worn System", UIST'12, Proceedings of the Annual ACM Symposium on User Interface Software and Technology, Cambridge, Massachusetts, USA, Oct. 7, 2012, pp. 123-129.
Simon Olberding et al. "Augmented Forearm", 20130307; 20130307-2013-0308, Mar. 7, 2013, pp. 9-12.
Smartwatchnews: "EmoPulse Smile, Best smartwatch so far", Jun. 10, 2013, Retrieved from the Internet: URL:https://www.youtube.com/gIncowatch?v=LzPorA, 1 page.
Office Action for Euopean Application No. 13 798 634.9 dated May 17, 2017, 8 pages.
Office Action for European Application No. 13 795 278.4 dated May 17, 2017, 10 pages.
Office Action for European Application No. 13 795 277.6 dated May 11, 2017, 8 pages.
Office Action for U.S. Appl. No. 14/895,200 dated Apr. 24, 2017.
International Search Report and Written Opinion for International Application No. PCT/FI2013/051016 dated Jul. 31, 2014, 16 pages.
International Search Report and Written Opinion for International Application No. PCT/FI2013/051014 dated Jul. 31, 2014, 13 pages.
International Search Report and Written Opinion from International Application No. PCT/US2013/047143, dated Mar. 25, 2014, 10 pages.
Kien, D. T., *A Review of 3D Reconstruction From Video Sequences*, ISIS Technical Report Services, Draft Version 01 (2005) 35 pages.
Ma, Y. et al., *An Invitation to 3-D Vision, From Images to Geometric Models*, Springer Science+BusinessMedia, LLC (2004) 542 pages.
McNerney, T. S., *Tangible Programming Bricks: An approach to making programming accessible to everyone*, Thesis, Massachusetts Institute of Technology (Feb. 2000) 86 pages.
Merrill, D., *Toy Tiles That Talk to Each Other*, TED Talk, YouTube Video [online] [retrieved May 25, 2017] https://www.ted.com/talks/david_merrill_demos_siftables_the_smart_blocks>. (dated Feb. 2009) 8 pages.

(56) References Cited

OTHER PUBLICATIONS

Wacharamanotham, C. et al., *The Interactive Bracelet: an Input Device for Bimanual Interactions*, MobileHCI 2010 (Sep. 2010), 4 pages.
Toy Tiles That Talk to Each Other [online] [retrieved Jul. 24, 2017]. Retrieved from the Internet: <URL:https://www.ted.com/talks/david_merrill_demos_siftables_the_smart_blocks>. (filmed Feb. 2009), 4 pages.
The Interactive Bracelet: An input device for bimanual interaction [online] [retrieved Jul. 24, 2017]. Retrieved from the Internet: <URL: http://hci.rwth-aachen.de/materials/publications/wacharamanotham2010a.pdf>, 4 pages.
MIT Media Lab: Siftables [online] [retrieved Jul. 24, 2017]. Retrieved from the Internet: <URL: https://www.youtube.com/watch?v=vbwzBBHtNGI>. (Published Mar. 14, 2008), 3 pages.
MIT Media Lab: Siftables—You Tube Video [online] [retrieved May 25, 2017]. <https://www.youtube.com/watch?v=vbwzB-BHtNGI>. (dated Mar. 14, 2008) 2 pages.
Notice of Allowance for U.S. Appl. No. 14/895,200 dated Oct. 5, 2017, 14 pages.
Office Action for U.S. Appl. No. 15/030,457 dated Sep. 14, 2017, 26 pages.
Office Action for Chinese Application No. 201380080571.4 dated Apr. 2, 2014, 8 pages.
Office Action for U.S. Appl. No. 15/031,287 dated Apr. 13, 2018, 11 pages.
Office Action for Chinese Application No. 201380080572.9 dated Apr. 18, 2018, with English Summary 9 pages.
Summons to attend oral proceedings pursuant to Rule 115(1) EPC for European Application No. 13 795 277.6 dated Mar. 26, 2018, 11 pages.
Summons to attend oral proceedings pursuant to Rule 115(1) EPC for European Application No. 13 795 278.4 dated Feb. 20, 2018, 12 pages.
Summons to attend oral proceedings pursuant to Rule 115(1) EPC for European Application No. 13 798 364.9 dated Apr. 5, 2018, 11 pages.
Office Action for U.S. Appl. No. 15/030,457 dated Jan. 10, 2018, 19 pages.
Office Action for European Application No. 13 795 278.4 dated Sep. 12, 2018, 4 pages.
Office Action for European Application No. 13 734 598.9 dated Sep. 19, 2018, 5 pages.
Office Action for U.S. Appl. No. 15/031,287 dated Oct. 24, 2018.

\* cited by examiner

| Circumstance 602 | Image 612 |
| --- | --- |
| Circumstance 604 | Image 614 |
| Circumstance 606 | Image 616 |

FIG. 6A

| Program 622 | Circumstance 632 | Image 642 |
| --- | --- | --- |
| Program 624 | Circumstance 634 | Image 644 |
| Program 626 | Circumstance 636 | Image 646 |

FIG. 6B

DETERMINING A REPRESENTATION OF AN IMAGE AND CAUSING DISPLAY OF THE REPRESENTATION BY A BEAD APPARATUS

RELATED APPLICATION

This application is a U.S. National Phase application filed under 35 U.S.C. § 371 of the PCT Application No. PCT/FI2013/051017 filed Oct. 28, 2013.

TECHNICAL FIELD

The present application relates generally to causing display of a representation of an image.

BACKGROUND

Electronic apparatuses are becoming increasing prevalent. Users are increasingly utilizing electronic apparatuses in conjunction with one or more additional accessory apparatuses. It may be desirable to allow for convenient and natural interactions with user electronic apparatuses.

SUMMARY

Various aspects of examples of the invention are set out in the claims.

One or more embodiments may provide an apparatus, a computer readable medium, a non-transitory computer readable medium, a computer program product, and a method for receiving a representation of an image, the image being based, at least in part, on at least one operational circumstance, determining a first part of the representation based, at least in part, on a position of a first bead apparatus, causing display of the first part of the representation by the first bead apparatus, determining a second part of the representation based, at least in part, on a position of a second bead apparatus, and causing display of, at least a portion of, the second part of the representation by the second bead apparatus.

One or more embodiments may provide an apparatus, a computer readable medium, a computer program product, and a non-transitory computer readable medium having means for receiving a representation of an image, the image being based, at least in part, on at least one operational circumstance, means for determining a first part of the representation based, at least in part, on a position of a first bead apparatus, means for causing display of the first part of the representation by the first bead apparatus, means for determining a second part of the representation based, at least in part, on a position of a second bead apparatus, and means for causing display of, at least a portion of, the second part of the representation by the second bead apparatus.

In at least one example embodiment, the apparatus is the first bead apparatus

In at least one example embodiment, causation of display of the second part of the representation comprises sending the second part of the representation to the second bead apparatus In at least one example embodiment, wherein the second part of the representation comprises a third part of the representation that is associated with a third bead apparatus, and a portion of the second part of the representation to be displayed by the second bead apparatus.

In at least one example embodiment, the first bead apparatus comprises a display, and causation of display of the first part of the representation by the first bead apparatus comprises display of the first part of the representation on the display.

In at least one example embodiment, the first bead apparatus comprises another display.

One or more example embodiments further perform determination that the first bead apparatus has transitioned from a first orientation to a second orientation.

In at least one example embodiment, the determination that the first bead apparatus has transitioned from the first orientation to the second orientation occurs absent user input indicative of the transition.

In at least one example embodiment, the first orientation is an orientation wherein the display faces in a direction, and the other display faces a different direction, and the second orientation is an orientation wherein the other display faces the direction.

One or more example embodiments further perform causing termination of display of the first part of the representation on the display and causing display of the first part of the representation on the other display.

In at least one example embodiment, termination of display of, at least a portion, the first part of the representation on the display and causing display of, at least the portion, the first part of the representation on the other display is based, at least in part, on a determination that the other display faces the direction.

In at least one example embodiment, the direction is a direction that corresponds with a normal angle to a nearest surface of a user.

In at least one example embodiment, the nearest surface is a surface of the user upon which the first bead apparatus is worn.

In at least one example embodiment, the first part of the representation comprises a first directional image, and the causation of display of the first part of the representation comprises causation of display of the first directional image to face the direction.

In at least one example embodiment, the first part of the representation comprises a second directional image, and further comprising causation of display of the second directional image to face the other direction.

In at least one example embodiment, the first part of the representation comprises a first directional image and a second directional image, and the causation of display of the first part of the representation comprises causation of display of the first directional image to face a first predetermined direction and causation of display of the second directional image to face a second predetermined direction.

In at least one example embodiment, the first predetermined direction is a direction that corresponds with a normal angle to a nearest surface of a user.

In at least one example embodiment, the nearest surface is a surface of the user upon which the first bead apparatus is worn.

In at least one example embodiment, the second predetermine direction is a direction that is perpendicular to the first predetermined direction.

One or more example embodiments further perform determination of the position of the first bead apparatus and the position of the second bead apparatus.

In at least one example embodiment, the determination of the position of the first bead apparatus and the position of the second bead apparatus occurs absent user input indicative of the position of the first bead apparatus and the position of the second bead apparatus.

In at least one example embodiment, the position of the first bead apparatus is a predetermined position of the first bead apparatus and the position of the second bead apparatus is a position relative to the position of the first bead apparatus.

In at least one example embodiment, the first bead apparatus and the second bead apparatus communicate directly via a direct communication channel between the first bead apparatus and the second bead apparatus, and causing display of the second part of the representation comprises sending the second part of the representation to the second bead apparatus via the direct communication channel.

In at least one example embodiment, the first bead apparatus and the second bead apparatus communicate indirectly via an indirect communication channel by way of at least a third bead apparatus, and causing display of the second part of the representation comprises sending the second part of the representation to the second bead apparatus via the indirect communication channel.

In at least one example embodiment, the representation comprises at least two predetermined segments.

In at least one example embodiment, determination of the first part of the representation comprises correlation between a first predetermined segment of the representation and the first bead apparatus.

In at least one example embodiment, determination of the second part of the representation comprises correlation between a second predetermined segment of the representation and the second bead apparatus.

One or more example embodiments further perform sending information indicative of a bead apparatus arrangement of the first bead apparatus and the second bead apparatus to a server.

One or more example embodiments further perform determination of the bead apparatus arrangement.

In at least one example embodiment, the determination of the bead apparatus arrangement comprises receiving information indicative of a bead apparatus position from at least the second bead apparatus, and the bead apparatus arrangement is based, at least in part, on the bead apparatus position of the second bead apparatus.

In at least one example embodiment, the determination of the bead apparatus arrangement is based, at least in part, on a predetermined bead apparatus arrangement.

In at least one example embodiment, the predetermined bead apparatus arrangement comprises information indicative of a predetermined arrangement of a number of bead apparatus.

In at least one example embodiment, the predetermined bead apparatus arrangement comprises information indicative of a predetermined bead apparatus spacing.

In at least one example embodiment, the predetermined bead apparatus spacing relates to a gap between the first bead apparatus and the second bead apparatus.

In at least one example embodiment, the image is based, at least in part, on correlation between the operational circumstance of the apparatus and at least one predetermined operational circumstance, the predetermined operational circumstance being associated with the image.

In at least one example embodiment, receipt of the representation of the image comprises receipt of the representation of the image from at least one memory.

In at least one example embodiment, receipt of the representation of the image comprises receipt of the image from a camera module, determination of the representation of the image based, at least in part, on the image, and receipt of the representation of the image from at least one memory.

In at least one example embodiment, the operational circumstance identifies a context in which the apparatus is being utilized.

In at least one example embodiment, the operational circumstance identifies a program that the apparatus is executing.

In at least one example embodiment, the operation circumstance identifies a program associated with media content, and the image is based, at least in part, on the media content.

In at least one example embodiment, the program is a media player, and the media content is media content that the media player is rendering.

In at least one example embodiment, the image is based, at least in part, on correlation between metadata associated with the media content and at least one predetermined metadata identifier associated with the image.

In at least one example embodiment, the metadata identifies a genre, and the predetermined metadata identifier identifies the genre.

In at least one example embodiment, the metadata identifies an artist, and the predetermined metadata identifier identifies the artist.

In at least one example embodiment, the media content is audio media content, and metadata associated with the media content identifies a genre of the media content, and the image is further based, at least in part, on the genre.

In at least one example embodiment, the audio media content is at least one of a song, an album, or a playlist.

In at least one example embodiment, the genre is a general type that classifies the audio media content.

In at least one example embodiment, the operation circumstance identifies a program associated with capture of visual content by way of a camera module, and the image is based, at least in part, on the visual content.

In at least one example embodiment, the image is comprised by the visual content.

In at least one example embodiment, the operation circumstance identifies a program associated with internet shopping content, and the image is based, at least in part, on the internet shopping content.

In at least one example embodiment, the internet shopping content identifies an internet shopping product, and the image is further based, at least in part, on the internet shopping product.

In at least one example embodiment, the internet shopping product is a product offered for sale via an internet shopping website.

In at least one example embodiment, the product is at least one of a good or a service.

In at least one example embodiment, the internet shopping website is a website associated with electronic commerce.

In at least one example embodiment, the internet shopping product is a product offered for sale via an internet shopping application.

In at least one example embodiment, the internet shopping application is a program associated with electronic commerce.

In at least one example embodiment, the internet shopping content comprises information indicative of the internet shopping product and an image of the internet shopping product.

In at least one example embodiment, the operation circumstance identifies a program associated with communication with a separate apparatus, and the image is based, at least in part, on the communication with the separate apparatus.

In at least one example embodiment, the separate apparatus is an image designation apparatus.

In at least one example embodiment, the communication with the separate apparatus is by way of near field communication.

In at least one example embodiment, the separate apparatus is a near field communication tag.

In at least one example embodiment, the separate apparatus is a merchant image designation apparatus, the communication with the separate apparatus identifies a merchant image identifier associated with a merchant product, and the image is further based, at least in part, on the merchant image identifier.

In at least one example embodiment, the merchant image designation apparatus is a near field communication tag.

In at least one example embodiment, the merchant image designation apparatus is a near field communication tag located in a merchant store.

In at least one example embodiment, the merchant image identifier identifies an image source associated with the image.

In at least one example embodiment, the merchant image identifier identifies an image associated with a merchant product.

In at least one example embodiment, the merchant product is at least one of a good or a service offered for sale in a merchant store.

In at least one example embodiment, the apparatus comprises a display.

One or more example embodiments further perform receipt of at least one image source identifier associated with an image source, and sending of a request for the image from the image source, wherein the receipt of the image is from the image source.

In at least one example embodiment, receipt of the image source identifier is from metadata associated with media content.

In at least one example embodiment, receipt of the image source identifier is from visual content captured by way of a camera module.

In at least one example embodiment, the image source identifier is based, at least in part, on a bar code.

In at least one example embodiment, receipt of the image source identifier is from internet shopping content.

In at least one example embodiment, receipt of the image source identifier is from a separate apparatus.

In at least one example embodiment, the separate apparatus is an image designation apparatus.

BRIEF DESCRIPTION OF THE DRAWINGS

For a more complete understanding of embodiments of the invention, reference is now made to the following descriptions taken in connection with the accompanying drawings in which:

FIGS. 6A-6B are diagrams showing operational circumstances according to at least one example embodiment;

DETAILED DESCRIPTION OF THE DRAWINGS

Figure 1:
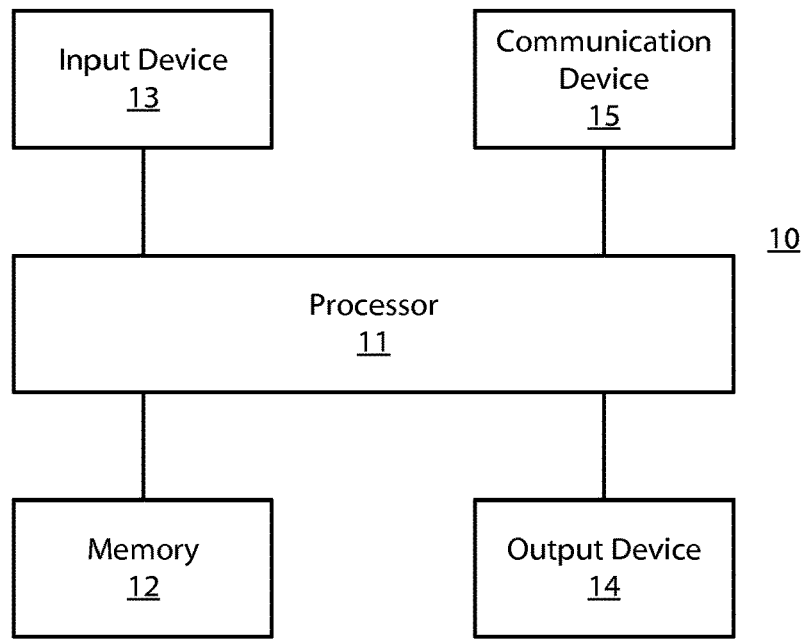
FIG. 1 is a block diagram showing an apparatus according to at least one example embodiment.

An embodiment of the invention and its potential advantages are understood by referring to FIGS. 1 through 15 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, a bead apparatus, a control bead apparatus, a wearable apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
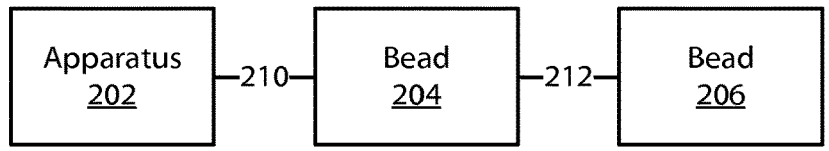
FIGS. 2A-2B are block diagrams showing apparatus communication according to at least one example embodiment.
Figure 2B:
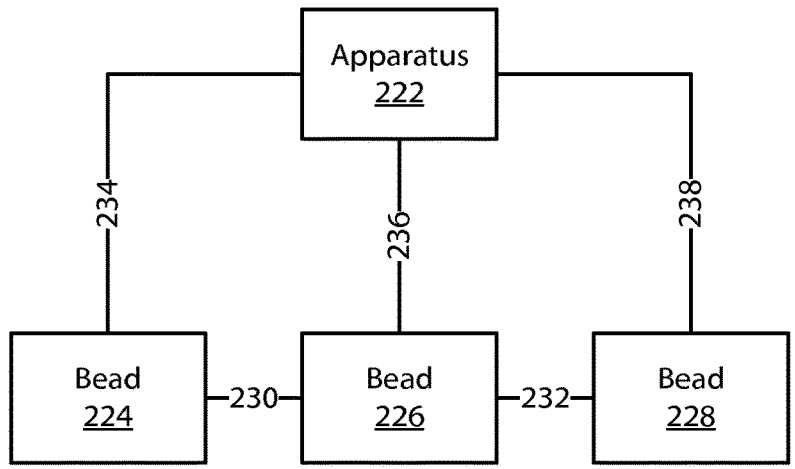

FIGS. 2A-2B are block diagrams showing apparatus communication according to at least one example embodiment. The examples of FIGS. 2A-2B are merely examples and do not limit the scope of the claims. For example, apparatus count may vary, bead apparatus count may vary, communication channels may vary, and/or the like.

As electronic apparatuses becoming increasingly prevalent, users may desire to interact with one or more electronic apparatuses in a convenient manner. For example, a user may desire to interact with their electronic apparatus by way of one or more separate electronic apparatuses. In at least one example embodiment, a separate electronic apparatus is a bead apparatus. The bead apparatus may be similar as described regarding FIGS. 4A-4B.

In some circumstances, a user may desire to utilize two or more bead apparatus in conjunction with each other. In at least one example embodiment, a first bead apparatus and a second bead apparatus communicate directly via a direct communication channel between the first bead apparatus and the second bead apparatus. A direct communication channel may, for example, be a near field communication channel, a wireless local area network communication channel, a Bluetooth communication channel, a wired communication channel, and/or the like. In one or more example embodiments, the first bead apparatus and the second bead apparatus communicate indirectly via an indirect communication channel by way of at least a third bead apparatus. For example, the first bead apparatus may be in direct communication with the intermediate third bead apparatus which, in turn, may be in direct communication with the second bead apparatus. The first bead apparatus may, for example, communicate with the second bead apparatus via the third bead apparatus.

In some circumstances, it may be desirable to centrally manage bead apparatus communication from a control apparatus. For example, the control apparatus may centrally orchestrate bead apparatus operation, communication, and/or the like. The control apparatus may, for example, be a tablet, cellphone, laptop, server, electronic apparatus, and/or the like. In at least one example embodiment, the control apparatus is a bead apparatus. For example, in the case of a first bead apparatus, a second bead apparatus, and a third bead apparatus, the first bead apparatus may manage operations, communications, and/or the like associated with the second bead apparatus and/or the third bead apparatus.

FIG. 2A is a block diagram showing apparatus communication according to at least one example embodiment. In the example of FIG. 2A, apparatus 202 is a control apparatus and each of beads 204 and 206 is a bead apparatus. In the example of FIG. 2A, apparatus 202 is in direct communication with bead 204 via communication channel 210. Bead 204 is in direct communication with bead 206 via communication channel 212. In the example of FIG. 2A, apparatus 202 is in indirect communication with bead 206 via an indirect communication channel by way of bead 204 and communication channels 210 and 212. For example, apparatus 202 may communicate with bead 204 via communication channel 210. Bead 204 may, subsequently, communicate with bead 206 via communication channel 212. Apparatus 202 may cause bead 204 to communicate with bead 206, may cause bead 204 to forward communication to bead 206, and/or the like. Although the example of FIG. 2A illustrates a control apparatus and two bead apparatus, additional bead apparatus may be in communication with apparatus 202, bead 204, and/or bead 206.

FIG. 2B is a block diagram showing apparatus communication according to at least one example embodiment. In the example of FIG. 2B, apparatus 222 is a control apparatus and each of beads 224, 226, and 228 is a bead apparatus. In the example of FIG. 2B, apparatus 222 is in direct communication with bead 224, bead 226, and bead 228 via communication channels 234, 236, and 238, respectively. In the example of FIG. 2B, bead 224 is in direct communication with bead 226 via communication channel 230. Bead 226 is in direct communication with bead 228 via communication channel 232. In the example of FIG. 2B, bead 224 is in indirect communication with bead 228 via an indirect communication channel by way of bead 226 and communication channels 230 and 232. For example, bead 224 may communicate with bead 226 via communication channel 230. Bead 226 may, subsequently, communicate with bead 228 via communication channel 232. Bead 224 may cause bead 226 to communicate with bead 228, may cause bead 226 to forward communication to bead 228, and/or the like. Additionally, each of beads 224, 226, and 228 may be in indirect communication with one another by way of apparatus 222 via communication channels 234, 236, and 238, respectively. Although the example of FIG. 2B illustrates a control apparatus and three bead apparatus, additional bead apparatus may be in communication with apparatus 222, bead 224, bead 226, and/or bead 228.

Figure 3:
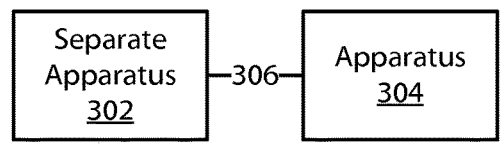
FIG. 3 is a block diagram showing apparatus communication according to at least one example embodiment.

FIG. 3 is a block diagram showing apparatus communication according to at least one example embodiment. The example of FIG. 3 is merely an example and does not limit the scope of the claims. For example, separate apparatus count may vary, apparatus count may vary, communication channels may vary, and/or the like.

In some circumstances, it may be desirable to allow for remote interaction with a bead apparatus. For example, a user may desire his or her control apparatus and/or bead apparatus to communicate with a separate apparatus. In at least one example embodiment, a control apparatus communicates with a separate apparatus. The separate apparatus may, for example, be a server, a database, a computer, a laptop, and/or the like. Such communication may comprise sending of information to the separate apparatus, receiving information from the separate apparatus, and/or the like. In at least one example embodiment, a communication channel between the separate apparatus and the control apparatus is a cellular communication channel, a wireless local area network communication channel, a local area network communication channel, a wide area network communication channel, and/or the like. In at least one example embodiment, the separate apparatus communicates with a bead apparatus acting as a control apparatus for one or more additional bead apparatuses.

FIG. 3 is a block diagram showing apparatus communication according to at least one example embodiment. In the example of FIG. 3, separate apparatus 302 may be a server, a database, a computer, a laptop, and/or the like. Apparatus 304 may, for example, be a control apparatus, a bead apparatus, and/or the like. In the example of FIG. 3, separate apparatus 302 and apparatus 304 are in communication via communication channel 306. Communication channel 306 may, for example, be a cellular communication channel, a wireless local area network communication channel, a local area network communication channel, a wide area network communication channel, and/or the like. Although the example of FIG. 3 illustrates a single separate apparatus and a single apparatus, one or more additional separate apparatus and/or apparatus may be in communication with separate apparatus 302 and/or apparatus 304. In the example of FIG. 3, apparatus 304 may relate to apparatus 202 of FIG. 2A and/or apparatus 222 of FIG. 2B.

Figure 4A:
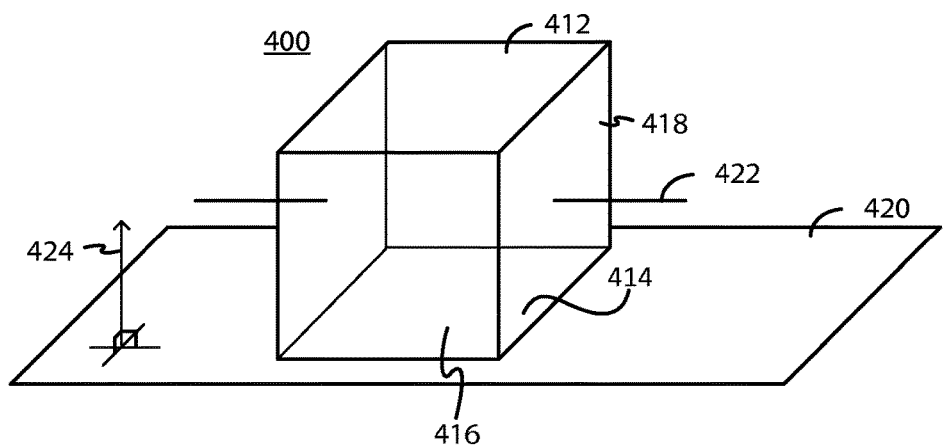
FIGS. 4A-4B are illustrations showing an apparatus according to at least one example embodiment.
Figure 4B:
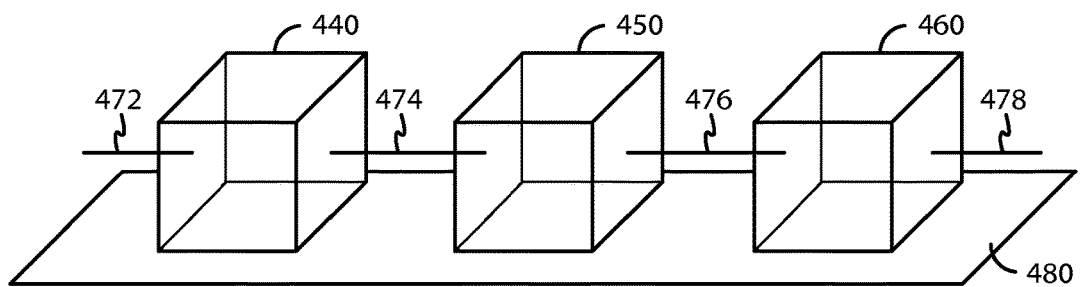

FIGS. 4A-4B are illustrations showing an apparatus according to at least one example embodiment. The examples of FIGS. 4A-4B are merely examples and do not limit the scope of the claims. For example, bead apparatus size, shape, design, and/or count may vary, bead apparatus arrangement may vary, connections between bead apparatuses may vary, and/or the like.

In some circumstances, a user may desire to utilize a bead apparatus as a companion apparatus. For example, a user may desire to use one or more bead apparatus in conjunction with an electronic apparatus, such as a cell phone, a tablet, and/or the like. In such an example, the user may desire to utilize the bead apparatus as a separate display and/or input device for use in conjunction with their electronic apparatus, for independent use, and/or the like. In at least one example embodiment, a bead apparatus is a display apparatus. In one or more example embodiments, a bead apparatus is a cube, a sphere, a rectangular prism, a triangular prism, a cylindrical prism, a trapezoidal prism, and/or the like. In at least one example embodiment, a bead apparatus comprises a display, a display and another display, and/or the like.

In some circumstances, it may be desirable to determine an orientation of a bead apparatus. In at least one example embodiment, a bead apparatus is rotatable along a specific axis. For example, a bead apparatus comprising a display and another display may be configured to rotate along an axis of the bead apparatus. In such an example, it may be desirable to modify utilization of the display and the other display of the bead apparatus based, at least in part, on the rotation. In at least one example embodiment, an apparatus determines that a bead apparatus has transitioned from a first orientation to a second orientation. The first orientation may, for example, relate to an orientation wherein the display faces in a direction, and the other display faces a different direction. The second orientation may, for example, be an orientation wherein the other display faces the direction. In at least one example embodiment, the direction is a direction that corresponds with a normal angle to a nearest surface of a user. The nearest surface may, for example, be a surface of the user upon which the bead apparatus is worn. For example, the nearest surface associated with a bead apparatus comprised by a bracelet of bead apparatuses may be the nearest surface of a user's wrist. The nearest surface associated with a bead apparatus comprised by a necklace of bead apparatuses may be the nearest surface of the user's neck, chest, shoulders, and/or the like. The nearest surface associated with a bead apparatus lying on a table may be the surface of the table. In one or more example embodiments, the determination that a bead apparatus has transitioned from the first orientation to the second orientation occurs absent user input indicative of the transition. For example, the bead apparatus determines a transition of orientation based, at least in part, on an orientation sensor, an accelerometer, orientation with respect to another bead apparatus, and/or the like.

In some circumstances, it may be desirable to associate a specific display of a bead apparatus with a specific direction. For example, a specific display of a bead apparatus may be designated as a top display, a side display, an inner display, an outer display, a primary display, and/or the like. In at least one example embodiment, a first predetermined direction is a direction that corresponds with a normal angle to a nearest surface of a user. In one or more example embodiments, a second predetermine direction is a direction that is perpendicular to the first predetermined direction, an angle that corresponds with a known angle of a display of a bead apparatus, and/or the like.

In at least one example embodiment, the apparatus utilizes a motion sensor, such as an accelerometer, a gyroscope, etc. to determine rotation of the apparatus. In another example, the apparatus may determine rotation by way of measure movement of the bead apparatus relative to a strand to which the bead apparatus is connected. For example, there may be a sensor that measures amount of rotation relative to the strand. It should be understood that there are many available sensors and methodologies that may be applicable to receiving a rotation input, and that many sensor and methodologies will emerge in the future, and that the scope of the claims are not limited in any way by sensors and/or methodologies for receiving an input indicative of rotation.

FIG. 4A is an illustration showing an apparatus according to at least one example embodiment. In the example of FIG. 4A, bead apparatus 400 is resting on surface 420. Surface 420 is the nearest surface associated with bead apparatus 400. In the example of FIG. 4A, surface 420 is associated with normal 424. Normal 424 related to a geometric normal associated with the plane of surface 420 and points in a direction perpendicular to surface 420. Bead apparatus 400 comprises sides 412, 414, 416, and 418. In the example of FIG. 4A, side 412 is the side of bead apparatus 400 facing in the direction of geometric normal 424. Side 414 is a side of bead apparatus 400 opposite of side 412. In the example of FIG. 4A, side 414 rests on surface 420. In the example of FIG. 4A, side 416 is a non-axial side of bead apparatus 400 and side 418 is an axial side of bead apparatus 400. Bead apparatus 400 may be configured to rotate about axis 422. In the example of FIG. 4A, axis 422 is centered within side 418 and passes through bead apparatus 400 at an angle perpendicular to side 418. Each of sides 412, 414, 416, and 418 may comprise a display. Although the example of FIG. 4A illustrates a 6-sided cube, bead apparatus 400 may be a sphere, a rectangular prism, a triangular prism, a cylindrical prism, a trapezoidal prism, and/or the like.

Bead apparatus 400 may be rotatable about axis 422. For example, as illustrated, side 412 faces in the direction of normal 424 associated with surface 420. Bead apparatus may be rotated, transitioned, and/or re-oriented about axis 422 such that side 416 faces in the direction of normal 424 associated with surface 420 and side 412 faces in a direction perpendicular to normal 424. In such an example, bead apparatus 400 may determine such a transition in orientation by way of an orientation sensor, an accelerometer, orientation with respect to another bead apparatus, and/or the like.

In some circumstances, it may be desirable to utilize a plurality of bead apparatus in conjunction with one another. For example, multiple bead apparatuses may be joined into a chain that may be worn by a user, carried by a user, and/or the like. In at least one example embodiment, multiple bead apparatuses are configured as a bracelet, a necklace, a belt, an earring, and/or the like. In some circumstances, it may be desirable to determine a relative position of a bead apparatus with respect to another bead apparatus, for example, to coordinate use of the two bead apparatuses, to arrange utilization of the two bead apparatuses, and/or the like. In at least one example embodiment, an apparatus determinates a position of a first bead apparatus and a position of a second bead apparatus. The determination of the position of the first bead apparatus and the position of the second bead apparatus may, for example, occur absent user input indicative of the position of the first bead apparatus and the position of the second bead apparatus, occur based, at least in part, on user input indicative of the position of the first bead apparatus and the position of the second bead apparatus, and/or the like. In at least one example embodiment, the position of the first bead apparatus is a predetermined position of the first bead apparatus and the position of the second bead apparatus is a position relative to the position of the first bead apparatus. For example, the predetermined position of the first bead apparatus may be a first position, a last position, a middle position, and/or the like. The position of the second bead apparatus may be a position adjacent to the first bead apparatus, opposite the first bead apparatus, and/or the like.

In some circumstances, it may be desirable to determine positions of multiple bead apparatuses such that an overall arrangement of bead apparatuses may be determined. For example, when using multiple bead apparatuses in conjunction with each other, it may be desirable to utilize a display from each bead apparatus, to utilize the bead apparatus for input, to display sequential information on the bead apparatuses, and/or the like. In at least one example embodiment, an apparatus determines a bead apparatus arrangement. The bead apparatus arrangement may, for example, comprise information indicative of relative position for at least two bead apparatuses. In one or more example embodiment, determination of the bead apparatus arrangement comprises receiving information indicative of a bead apparatus position from at least the second bead apparatus, and the bead apparatus arrangement is based, at least in part, on the bead apparatus position of the second bead apparatus. For example, in the case of a bead apparatus operating as a control apparatus, the position of the bead apparatus may relate to a predetermined position. A first bead apparatus may, for example, receive information indicative of the position of a second bead apparatus with respect to the position of the first bead apparatus. For example, the first bead apparatus may receive information indicative of the second bead apparatus being positioned adjacent to the first bead apparatus, separated from the first bead apparatus by at least a third bead apparatus, and/or the like. In such an example, the first bead apparatus may receive information indicative of the position of the second bead apparatus by way of at least a third bead apparatus such that the first bead apparatus may determine that the third bead apparatus is positioned adjacent to the first bead apparatus and the second bead apparatus is positioned adjacent to the third bead apparatus.

In some circumstances, a bead apparatus arrangement may be predefined, predetermined, and/or the like. For example, two or more bead apparatuses may be arranged in a specific order, orientation, configuration, and/or the like. The determination of the bead apparatus arrangement may, for example, be based, at least in part, on a predetermined bead apparatus arrangement. In one or more example embodiments, the predetermined bead apparatus arrangement comprises information indicative of a predetermined arrangement of a number of bead apparatus. For example, the first bead apparatus may be predetermined to be positioned adjacent to the second bead apparatus. The second bead apparatus may, for example, be predetermined to be positioned between the first bead apparatus and a third bead apparatus. In at least one example embodiment, the predetermined bead apparatus arrangement comprises information indicative of a predetermined bead apparatus spacing. The predetermined bead apparatus spacing may, for example, relate to a gap between the first bead apparatus and the second bead apparatus. In some circumstances, it may be desirable to communicate a bead apparatus arrangement to a separate apparatus. For example, a separate apparatus may benefit from information indicative of the bead apparatus arrangement for purposes associated with determining, generating, modifying, communicating, and/or the like information and/or data to multiple bead apparatuses described by the bead apparatus arrangement. In at least one example embodiment, the apparatus sends information indicative of a bead apparatus arrangement of the first bead apparatus and the second bead apparatus to a separate apparatus. The separate apparatus may, for example, be a server, a database, a computer, a laptop, and/or the like.

FIG. 4B is an illustration showing an apparatus according to at least one example embodiment. In the example of FIG. 4B, bead apparatus 440 is connected to bead apparatus 450, bead apparatus 450 which is in turn connected to bead apparatus 460. Each of bead apparatuses 440, 450, and 460 is resting on surface 480. In the example of FIG. 4B, surface 480 may be the nearest surface associated with bead apparatuses 440, 450, and 460. In the example of FIG. 4B, bead apparatus 440 is configured to connect to one or more additional bead apparatuses in the direction of axis 472. Bead apparatus 460 is configured to connect to one or more additional bead apparatuses in the direction of axis 478. In the example of FIG. 4B, each of connections 474 and 476 may be a chain, a tether, a wire, a communication link, and/or the like running through the rotatable axis of bead apparatus 440, 450, and 460. In the example of FIG. 4B, a length of connection 474 may be a bead apparatus spacing between bead apparatus 440 and 450. A length of connection 476 may be a bead apparatus spacing between bead apparatus 450 and 460. Although the example of FIG. 4B illustrates three bead apparatuses connected in a straight line, bead apparatuses 440, 450, and 460 may be associated with one or more additional bead apparatuses and/or bead apparatus to bead apparatus connections. For example, bead apparatus 440 and bead apparatus 460 may be connected, forming a three bead apparatus loop.

Figure 5A:
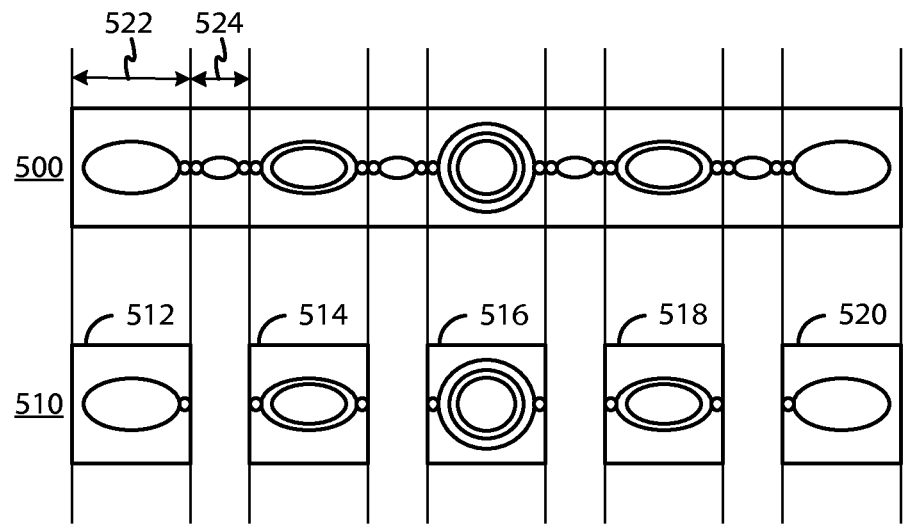
FIGS. 5A-5B are illustrations showing image segmentation according to at least one example embodiment.
Figure 5B:
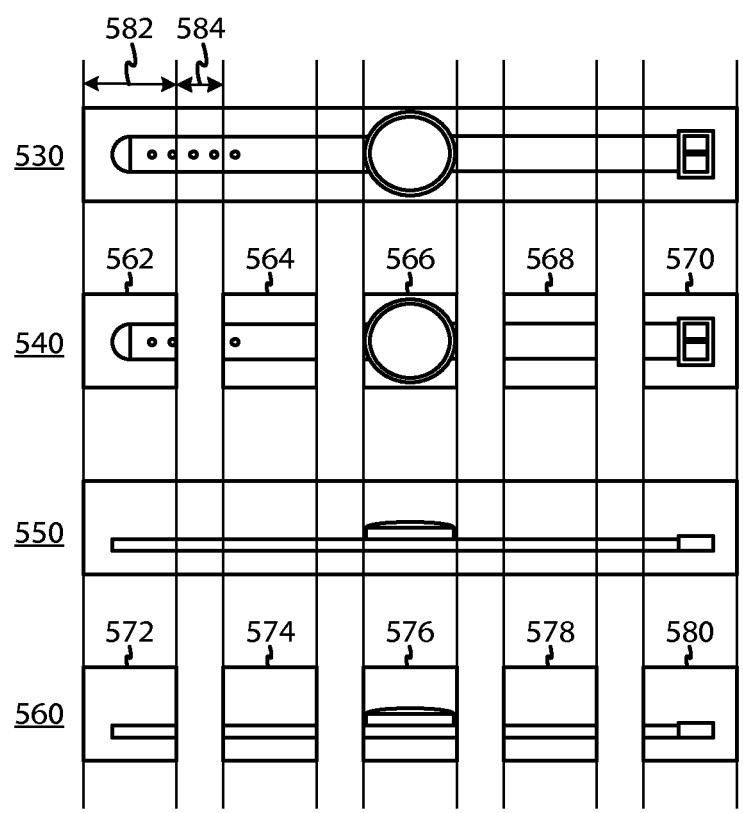

FIGS. 5A-5B are illustrations showing image segmentation according to at least one example embodiment. The examples of FIGS. 5A-5B are merely examples and do not limit the scope of the claims. For example, images and/or representations of images may vary, segment count, size, proportion, and/or arrangement may vary, directional image count may vary, and/or the like.

In some circumstances, it may be desirable to utilize multiple bead apparatuses to collectively display an image. For example, a user may desire to display an image such that the image spans across multiple displays associated with multiple bead apparatuses. In at least one example embodiment, an apparatus receives a representation of an image. Receipt of the representation of the image may, for example, comprise receipt of the representation of the image from at least one memory, from a separate apparatus, from a bead apparatus, from a camera module associated with the apparatus, and/or the like. In at least one example embodiment, a bead apparatus receives a representation of an image from another bead apparatus.

In order to facilitate display of a representation of an image such that the representation spans two or more bead apparatuses, it may be desirable to segment the representation of the image based, at least in part, on bead apparatus count, bead apparatus arrangement, bead apparatus size, bead apparatus proportions, bead apparatus display count, bead apparatus display proportions, bead apparatus display type, and/or the like. In at least one example embodiment, an apparatus determines a part of the representation based, at least in part, on a position of an associated bead apparatus. In one or more example embodiments, the apparatus determine a second part of the representation based, at least in part, on a position of a second bead apparatus. For example, in the case of two connected bead apparatuses, the apparatus receives a representation of an image and determines at least a first and second portion of the representation for display by the first and second bead apparatuses, respectively. In at least one example embodiment, the apparatus causes display of a part of the representation by an associated bead apparatus. Causation of display of the part of the representation by the bead apparatus may, for example, comprise display of the part of the representation on the display of the bead apparatus. In at least one example embodiment, a representation of an image received from another bead apparatus is re-segmented based, at least in part, on a different bead apparatus count, a different bead apparatus arrangement, a different bead apparatus size, a different bead apparatus proportion, a different bead apparatus display count, a different bead apparatus display proportion, a different bead apparatus display type, and/or the like, such that the re-segmented representation of the image is optimized for display by the other bead apparatus. For example, the most relevant parts of the representation may be displayed, the representation of the image may be enlarged, the representation of the image may be skewed, and/or the like. Bead apparatus count may, for example, relate to a number of bead apparatuses associated with an apparatus, a number of active bead apparatuses associated with an apparatus, and/or the like. An active bead apparatus may, for example, be a bead apparatus that is powered on, a bead apparatus that is configured to receive a representation of an image, and/or the like.

In some circumstances, it may be desirable to segment the representation of the image prior to transmission to the apparatus. For example, it may be desirable to offload such a segmentation determination, to conserve apparatus resources, to standardize segmentation, and/or the like. In at least one example embodiment, the representation comprises at least two predetermined segments. A predetermined segment may, for example, be a segment of the representation of the image determined based, at least in part, on bead apparatus count, bead apparatus arrangement, bead apparatus size, bead apparatus proportions, bead apparatus display count, bead apparatus display proportions, bead apparatus display type, and/or the like. A predetermined segment may, for example, be a region of the representation of the image specifically determined, cropped, formatted, and/or the like for display on a specific display associated with a specific bead apparatus.

In at least one example embodiment, determination of a part of the representation comprises correlation between a predetermined segment of the representation and a bead apparatus. In one or more example embodiments, determination of the second part of the representation comprises correlation between a second predetermined segment of the representation and the second bead apparatus. Correlation between a predetermined segment of the representation and a bead apparatus relates to alignment between the full representation of the image and a position of the bead apparatus within an overall bead apparatus arrangement, factoring in bead apparatus count, bead apparatus spacing, display size, shape, and/or proportion, and/or the like. In at least one example embodiment, a part of the representation comprises a first directional image and a second directional image. In such an example, causation of display of the part of the representation may comprise causation of display of the first directional image to face a first predetermined direction and causation of display of the second directional image to face a second predetermined direction. For example, a representation of an image may comprise a top view representation of the image and a profile view representation of the image. In such an example, the apparatus may cause display of the top view representation of the image such that the top view representation faces in the direction of a geometric normal associated with the nearest surface. The apparatus may further, for example, cause display of the profile view representation of the image such that the profile view representation faces in a direction perpendicular to the geometric normal associated with the nearest surface.

In some circumstances, it may be desirable to modify, adjust, move, and/or the like display of a representation of an image based, at least in part, on orientation of a bead apparatus. For example, if a bead apparatus rotates about a rotatable axis, a user may desire modification of the display location. In at least one example embodiment, an apparatus causes termination of display of a part of the representation on a display based, at least in part, on a transition from a first orientation to a second orientation. In such an example, the apparatus may further cause display of the part of the representation on another display. Termination of display of, at least a portion of, the part of the representation on the display and causing display of, at least the portion of, the part of the representation on the other display may be based, at least in part, on a determination that the other display faces a specific direction. For example, the entire portion of the representation may comprise two distinct directional images, each displayed on a different display of a bead apparatus. In such an example, it may be desirable to maintain display of a directional image such that the directional image faces in the direction of a geometric normal associated with a nearest surface. In at least one example embodiment, a direction facing a direction of a geometric normal associate with a nearest surface relates to an outward facing direction. Similarly, a display oriented such that the display faces an outward facing direction may, for example, be an outward facing display. In the case of reorientation of a bead apparatus such that a directional image faces in a direction perpendicular to the geometric normal, an apparatus may cause termination of the directional image by the display and cause display of the directional image on another display, which is now facing in the direction of the geometric normal. In at least one example embodiment, a part of a representation comprises a directional image, and causation of display of the part of the representation comprises causation of display of the directional image to face the direction. In at least one example embodiment, a part of a representation comprises another directional image. In such an example, the apparatus may further cause display of the other directional image to face another direction.

FIG. 5A is an illustration showing image segmentation according to at least one example embodiment. In the example of FIG. 5A, a user may be shopping at a jewelry store while wearing one or more bead apparatuses. The one or more bead apparatuses may, for example, be configured as a bracelet worn on the user's wrist. The apparatus may, in such an example, receive information indicative of an image source identifier by way of near field communication. For example, the user may pass the bead apparatus bracelet over an advertisement for a specific gemmed bracelet within the jewelry store. In such an example, as a result, the bead apparatus bracelet receives and causes display of a representation of the gemmed bracelet, segmented for display on the one or more bead apparatuses comprising the bead apparatus bracelet. In the example of FIG. 5A, representation 500 may be a representation of an image of a bracelet. Bead apparatus collection 510 comprises bead apparatus displays 512, 514, 516, 518, and 520. Bead apparatus collection 510 is associated with a bead apparatus arrangement identifying the relative positions of the bead apparatuses associated with the bead apparatus displays. In the example of FIG. 5A, segmentation 522 may be a relative bead apparatus display width. Bead apparatus spacing 524 may be a relative gap between two adjacent bead apparatuses, such as the gap between bead apparatus associated with bead apparatus displays 512 and 514. In the example of FIG. 5A, representation 500 may be a directional image, or a top view, of a bracelet and is intended for display across bead apparatus displays 512, 514, 516, 518, and 520. In the example of FIG. 5A, segmentation of representation 500 is based, at least in part, on a total size and/or proportion of bead apparatus collection 510, including any gaps between adjacent bead apparatuses, such as bead apparatus spacing 524 between bead apparatus associated with bead apparatus displays 512 and 514. Representation 500 is segmented into five segments, each individual segment correlating with a specific bead apparatus display. For example, the bead apparatus associated with bead apparatus display 516 is positioned in the middle of the bead apparatus arrangement of bead apparatus collection 510 and correlates with the middle segment of representation 500. Although the example of FIG. 5A illustrates five bead apparatus displays, segmentation 522, and bead apparatus spacing 524, representation 500 may be displayed across additional bead apparatus displays, across additional bead apparatuses, across bead apparatus displays of different designs, proportions, shapes, and/or sizes, and/or the like.

In at least one example embodiment, an apparatus causes display of a first part of a representation by a first bead apparatus, and further causes display of, at least a portion of, a second part of the representation by the second bead apparatus. The second part of the representation may, for example, comprise at least a third part of the representation that is associated with at least a third bead apparatus, and a portion of the second part of the representation to be displayed by the second bead apparatus. For example, a first bead apparatus may be associated with additional bead apparatus. In the example of FIG. 5A, bead apparatus 512 is associated with bead apparatuses 514-520. In such an example, bead apparatus 512 may receive a representation of an image for display by bead apparatuses 512-520. Bead apparatus 512 may determine a first and a second portion of the representation, cause display of the first portion of the representation by a display of bead apparatus 512, and communicate the second portion of the representation to bead apparatus 514. The second portion of the representation may comprise a sub-portion associated with the bead apparatus 514 and a sub-portion associated with the bead apparatuses 516-520. Bead apparatus 514 may cause display of the sub-portion of the second portion of the representation of the image associated with bead apparatus 514 by a display of bead apparatus 514. Bead apparatus 512 may, for example, additionally cause display of the sub-portion of the second portion of the representation of the image associated with bead apparatus 516-520. In such an example, causing display of the sub-portion of the second portion of the representation of the image associated with bead apparatuses 516-520 may comprise causing communication of the sub-portion of the second portion of the representation of the image associated with bead apparatuses 516-520 from the bead apparatus 514 and to bead apparatus 516. In at least one example embodiment, causation of display of a second part of a representation comprises sending the second part of the representation to a second bead apparatus. In one or more example embodiments, causing display of the second part of the representation comprises sending the second part of the representation to the second bead apparatus via the direct communication channel. In one or more example embodiments, causing display of the second part of the representation comprises sending the second part of the representation to the second bead apparatus via the indirect communication channel.

FIG. 5B is an illustration showing image segmentation according to at least one example embodiment. In the example of FIG. 5B, a user may be browsing an online watch marketplace while wearing one or more bead apparatuses. The one or more bead apparatuses may, for example, be configured as a bracelet worn on the user's wrist. The apparatus may, in such an example, receive information indicative of an image source identifier by way of visual capture of a bar code, a two-dimensional bar code, a quick response code, and/or the like. For example, the user may capture an image of a bar code associated with an advertisement for a specific wrist watch for sale. In such an example, as a result, the bead apparatus bracelet receives and causes display of a representation of the wrist watch, segmented for display on the one or more bead apparatuses comprising the bead apparatus bracelet. In the example of FIG. 5B, representation 530 may be a representation of an image of a watch. Specifically, representation 530 may be a directional image, or a top view, of a watch. In the example of FIG. 5B, representation 550 may be a different directional image, or a profile view, of the watch of representation 530. Bead apparatus collection 540 comprises bead apparatus associated with bead apparatus displays 562, 564, 566, 568, and 570. Bead apparatus collection 540 is associated with a bead apparatus arrangement identifying the relative positions of the bead apparatuses associated with the bead apparatus displays. In the example of FIG. 5B, segmentation 582 may be a relative bead apparatus display width. Bead apparatus spacing 584 may be a relative gap between two adjacent bead apparatuses, such as the gap between the bead apparatuses associated with bead apparatus displays 562 and 564. In the example of FIG. 5B, representation 530 may be a directional image, or a top view, of a watch and is intended for display across bead apparatus displays facing in the direction of a geometric normal associated with the nearest surface associated with the bead apparatuses associated with bead apparatus displays 562, 564, 566, 568, and 570. In the example of FIG. 5B, segmentation of representation 530 is based, at least in part, on a total size and/or proportion of bead apparatus collection 540, including any gaps between adjacent bead apparatuses, such as bead apparatus spacing 584. Representation 530 is segmented into five segments, each individual segment correlating with a specific bead apparatus display. For example, bead apparatus display 566 is positioned in the middle of the bead apparatus arrangement of bead apparatus collection 540 and correlates with the middle segment of representation 530.

In the example of FIG. 5B, bead apparatus displays 562 and 572 are associated with a single bead apparatus, bead apparatus displays 564 and 574 are associated with a single bead apparatus, bead apparatus displays 566 and 576 are associated with a single bead apparatus, bead apparatus displays 568 and 578 are associated with a single bead apparatus, and bead apparatus displays 570 and 580 are associated with a single bead apparatus. In the example of FIG. 5B, representation 550 may be a directional image, or a profile view, of a watch and is intended for display across bead apparatus displays facing in a direction perpendicular to a geometric normal associated with the nearest surface associated with the bead apparatuses associated with bead apparatus displays 572, 574, 576, 578, and 580. In effect, a single bead apparatus displays two segments of two directional images associated with a representation of an image. For example, a single bead apparatus associated with bead apparatus displays 566 and 576 displays a segment of a first directional image representation, a top view of a watch face, on bead apparatus display 566 and a profile view of the same segment of the directional image representation, the watch face, on bead apparatus display 576. Although the example of FIG. 5B illustrates five bead apparatuses associated with a total of ten bead apparatus displays, segmentation 582, and bead apparatus spacing 584, representation 530 and/or representation 550 may be displayed across additional bead apparatus displays, across additional bead apparatuses, across bead apparatus displays of different designs, proportions, shapes, and/or sizes, and/or the like.

In some circumstances, a user may desire the ability to view a displayed object from more than one perspective via one or more outward facing displays. For example, the user may desire to view, via one or more outward facing displays, a second directional image subsequent to viewing a first directional image. In order to effect such subsequent display of the second directional image via one or more bead apparatuses, the user may rotate a bead apparatus. For example, a user may rotate a bead apparatus displaying a first directional image on a first screen facing an outward direction and displaying a second directional image on a second screen facing a direction perpendicular to the outward direction such that the second display faces the outward direction. In at least one example embodiment, the apparatus receives a rotation input. A rotation input may, for example, relate to rotation of the apparatus about an axis of the apparatus. Based, at least in part, on the rotation input, one or more different bead apparatuses associated with the bead apparatus may, for example, may shift display of a second directional image to an outward facing display. For example, in FIG. 5B, a bead apparatus associated with bead apparatus display 566 and 576 may be configured such that bead apparatus display 566 is facing an outward direction and bead apparatus display 576 is facing a direction perpendicular to the outward direction. The bead apparatus may, for example, receive a rotation input such that bead apparatus display 576 is reoriented to face the outward direction. Based, at least in part, on the rotation input, bead apparatus displays 562, 564, 568, and 570 may be caused to display the representations displayed by bead apparatus displays 572, 574, 578, and 580, respectively.

FIGS. 6A-6B are diagrams showing operational circumstances according to at least one example embodiment. The examples of FIGS. 6A-6B are merely examples and do not limit the scope of the claims. For example, row and/or column count may vary, table variables may vary, table arrangement may vary, and/or the like.

In some circumstances, a user may desire his or her bead apparatuses to respond and/or adapt to operational context associated with the bead apparatuses. For example, if a user is in a jewelry store, the user may desire a bracelet comprising multiple bead apparatus to display a specific bracelet across the displays associated with the bead apparatuses. Similarly, if the user is listening to rock music on an electronic apparatus associated with the bead apparatuses, the user may desire the bead apparatuses to dynamically reflect characteristics of the music. For example, the bead apparatuses may be configured to display a spiked leather bracelet based, at least in part, on the rock music. In at least one example embodiment, the image is based, at least in part, on correlation between at least one operational circumstance of the apparatus and at least one predetermined operational circumstance, the predetermined operational circumstance being associated with the image. An operational circumstance and/or a predetermined operational circumstance may, for example, relate to a location, a type of media, an application, a temperature, environment context, and/or the like. In one or more example embodiments, an apparatus requests a representation of an image based, at least in part, on at least one operational circumstance.

In some circumstances, a user may desire to cause display of a specific representation of an image on a set of bead apparatuses. For example, a user may desire to try on an expensive diamond bracelet for sale in an online jewelry store without having access to a physical bracelet. The user may, for example, use his or her bead apparatus to scan, photograph, read, etc. a bar code associated with the diamond bracelet presented by the online jewelry store website in order to cause display of a representation of the diamond bracelet on the user's set of bead apparatuses. In at least one example embodiment, an apparatus receives at least one image source identifier associated with an image source. The image source identifier may, for example, be a reference to an image and/or a representation of an image, a link to an image and/or a representation of an image, and/or the like. The image source identifier may be received from a separate apparatus by way of near field communication, wireless location area network communication, Bluetooth communication, visual capture of a barcode, visual capture of a quick response code, and/or the like, from at least one memory associated with the apparatus, from metadata associated with media content associated with the apparatus, and/or the like. In at least one example embodiment, receipt of an image source identifier is from visual content captured by way of a camera module. In at least one example embodiment, an apparatus receives at least one image source identifier associated with an image source and, subsequently, sends a request for an image from an image source. In such an example embodiment, the apparatus may receive the image from the image source, a separate apparatus, and/or the like. In another example embodiment, receipt of an image source identifier is from metadata associated with a song.

In some circumstances, an image source identifier may comprise a reference to an image, a reference to an image repository, a link to a representation of an image, and/or the like. For example, an image source identifier may comprise a uniform resource locator address at which an identified image may be downloaded, caused to be rendered, and/or the like. In at least one example embodiment, an apparatus sends a request for an image from an image source based, at least in part, on the image source identifier. In at least one example embodiment, the operational circumstance identifies a context in which the apparatus is being utilized. For example, the operational circumstance may identify an environment in which the apparatus is being used, a location of the apparatus, a program being executed by the apparatus, and/or the like. In at least one example embodiment, the operational circumstance identifies a program that the apparatus is executing.

In some circumstances, a user may desire to display a representation of an image on the user's one or more bead apparatuses based, at least in part, on media content associated with the bead apparatuses. For example, a user may be listening to heavy metal music. In such an example, the user may desire to have his or her bead apparatuses collectively display a representation of a spiked leather bracelet, as such a bracelet may be associated with heavy metal music and may be worn by heavy metal enthusiasts. In at least one example embodiment, the operation circumstance identifies a program associated with media content. In such an example embodiment, the image may be based, at least in part, on the media content. The media content may, for example, be audio media content, video media content, image media content, and/or the like. In at least one example embodiment, a program is a media player, and media content may be media content that the media player is rendering. For example, the media player may be a music player, and the media content may be a song, and album, a playlist, and/or the like, that the music player is playing. In such an example, the image may be based, at least in part, on the song, the album, the playlist, and/or the like. For example, display of the image of the spiked leather bracelet may be based, at least in part, on a user utilizing a music player program to play a heavy metal song, a heavy metal album, a heavy metal playlist, and/or the like.

In at least one example embodiment, an image is based, at least in part, on correlation between metadata associated with media content and at least one predetermined metadata identifier associated with the image. The metadata may, for example, identify a genre, and the predetermined metadata identifier identifies the genre, such that the two genres correlate. For example, metadata associated with a particular song may indicate a heavy metal genre, and the predetermined metadata identifier associated with the spiked leather bracelet may identify the heavy metal genre. Similarly, the metadata may identify an artist, and the predetermined metadata identifier may identify the artist, such that the two artists correlate. In at least one example embodiment, the media content is audio media content. In such an example embodiment, metadata associated with the media content may identify a genre of the media content. Further, in such an example, the image may be further based, at least in part, on the genre. For example, the image may be based, at least in part, on the aforementioned heavy metal genre. Audio media content may be a song, an album, a playlist, and/or the like. A genre may, for example, identify a general type that classifies audio media content. For example, a genre may identify classical music, heavy metal music, jazz music, and/or the like.

In some circumstances, a user may desire to display a representation of a particular product on the user's one or more bead apparatuses. For example, a user may be shopping online for a new wrist watch. In such an example, the user may desire to display a representation of a wrist watch that the user is interested in purchasing to see how the wrist watch will look on his wrist. In at least one example embodiment, an operation circumstance identifies a program associated with internet shopping content. In such an example embodiment, an image may be based, at least in part, on the internet shopping content. The program may, for example, be a web browser, an internet shopping application, and/or the like. The internet shopping content may, for example, comprise content associated with one or more products, one or more image associated with the products, one or more representations of images associated with the products, and/or the like. In at least one example embodiment, internet shopping content identifies an internet shopping product. In such an example embodiment, the image may be further based, at least in part, on the internet shopping product. For example, the internet shopping product may be a wrist watch, and the image is an image of the wrist watch. The internet shopping product may, for example, be a product offered for sale via an internet shopping website. The product may be a good, a service, and/or the like. In at least one example embodiment, an internet shopping website is a website associated with electronic commerce. Similarly, an internet shopping product may be a product offered for sale via an internet shopping application. The internet shopping application may, for example, be a program associated with electronic commerce. For example, the internet shopping application may be an auction-related application. In at least one example embodiment, internet shopping content comprises information indicative of an internet shopping product and an image of the internet shopping product. For example, an online wrist watch store may comprise internet shopping content that includes an image of a wrist watch, details pertaining to the wrist watch, and/or the like, to aid a user in making a decision to purchase the wrist watch. In such an example, the user may desire to display a representation of the image of the wrist watch on the user's bead apparatuses in order to further facilitate the user's decision-making process.

In some circumstances, a user may desire to display a representation of a particular product found in a store in which the user is shopping. For example, a user may be shopping in a mall for a new natural pearl bracelet. In such an example, the user may desire to display a representation of a natural peal bracelet that the user is interested in purchasing to see how the wrist watch will look on his wrist, without having to talk to a store employee and without having to physically try on the natural pearl bracelet. In such an example, one or more of the user's bead apparatuses may communicate with a separate apparatus within the store in order to receive information indicative of a representation of an image of the natural pearl bracelet. In at least one example embodiment, an operation circumstance identifies a program associated with communication with a separate apparatus. In such an example embodiment, the image may be based, at least in part, on the communication with the separate apparatus. For example, an apparatus may utilize a program to manage communication with a separate apparatus. The separate apparatus may, for example, be an image designation apparatus, a near field communication tag, and/or the like. In at least one example embodiment, communication with a separate apparatus may be by way of near field communication, Bluetooth, and/or the like. In at least one example embodiment, a separate apparatus is a merchant image designation apparatus. In such an example embodiment, communication with the separate apparatus may identify a merchant image identifier associated with a merchant product. An image may be based, at least in part, on the merchant image identifier. In at least one example embodiment, a merchant image designation apparatus is a near field communication tag, a server, a computer, a tablet, and/or the like. For example, the merchant image designation apparatus may be a near field communication tag located in a merchant store. The merchant image identifier may identify an image source associated with the image. For example, merchant image identifier may identify an image associated with a merchant product. The merchant product may be a good, a service, and/or the like, offered for sale in a merchant store. For example, the merchant product may be the aforementioned natural pearl bracelet offered for sale in a jewelry store.

In some circumstances, it may be desirable to generate a representation of an image captured by the apparatus. For example, a user may desire to display a pet lizard on a set of bead apparatuses forming a bracelet such that the lizard appears to be wrapped around the user's wrist. In at least one example embodiment, receipt of the representation of the image comprises receipt of the image from a camera module. For example, the apparatus may determine the representation of the image based, at least in part, on at least one two-dimensional capture and/or at least one three-dimensional capture. In such an example, a user may shoot one or more videos of an object to be displayed by the bead apparatuses. Using the captured video data, the apparatus may cause generation and storage of a representation of the object to be displayed by one or more displays of one or more bead apparatuses. For example, the apparatus may capture one or more video sequences for purposes related to a three-dimensional reconstruction method and/or structure from motion method, which may be methods associated with generation of an estimated three-dimensional structure from two-dimensional image sequences and/or local motion signals. Such two-dimensional image sequences, optionally complemented with motion signals from the external device sensors, may, for example, be obtained by capturing one or more image sequences and/or video sequences of a real world object from various different perspectives. An external device sensor may, for example, be a compass, a gyroscope, an accelerometer, and/or the like. In at least one example embodiment, an apparatus communicates information indicative of a two-dimensional image sequence to a separate apparatus. For example, the apparatus may communicate the two-dimensional image sequence to the separate apparatus for a purpose relating to a three-dimensional reconstruction method, structure from motion method, and/or the like. The separate apparatus may, for example, be a server, a computer, a laptop, a tablet, a phone, and/or the like. The separate apparatus may, for example, perform operations on the two-dimensional image sequence, such as feature detection and matching, structure and motion recovery, modeling, and/or the like, to construct a three-dimensional model of the real world object. The constructed three-dimensional model may, for example, be caused to be displayed on one or more bead apparatuses. For example, the one or more bead apparatus may be caused to display one or more representations of one or more segments associated with the three-dimensional model. In some circumstances, the one or more images and/or video sequences may be captured by way of a camera-related program or application. For example, a user may utilize a camera application to take a series of pictures of an object in order to facilitate construction of a representation of the object and display of the representation on the user's bead apparatuses. In at least one example embodiment, an operation circumstance identifies a program associated with capture of visual content by way of a camera module. In such an example embodiment, the image may be based, at least in part, on the visual content. In at least one example embodiment, the image is comprised by visual content captured by way of a camera module.

FIG. 6A is a diagram showing operational circumstances according to at least one example embodiment. In the example of FIG. 6A, predetermined operational circumstances are associated with specific images for display. Circumstances 602, 604, and 606 may be specific predetermined operational circumstances. In the example of FIG. 6A, circumstance 602 is associated with image 612, circumstance 604 is associated with image 614, and circumstance 606 is associated with image 616. For example, it may be desirable to display an image on one or more bead apparatuses based, at least in part, on operational circumstances associated with the bead apparatuses. In one example, a bead apparatus may determine existence of an operation circumstance that correlates with circumstance 602. In such an example, the bead apparatus may cause display of the image associated with circumstance 602, image 612, such that the image spans one or more displays of one or more bead apparatuses.

FIG. 6B is a diagram showing operational circumstances according to at least one example embodiment. In the example of FIG. 6B, two specific predetermined operational circumstances are associated with specific images for display. Programs 622, 624, and 626 may be specific program-related operational circumstances. For example, program 622 may be a music-related program, program 624 may be a jewelry-related program, and/or program 626 may be a time-related program. Circumstances 632, 634, and 636 may be specific predetermined operational circumstances associated with the respective program-related operational circumstances. In the example of FIG. 6B, program 622 is associated with circumstance 632 and image 642, program 624 is associated with circumstance 634 and image 644, and program 626 is associated with circumstance 636 and image 646. For example, it may be desirable to display an image on one or more bead apparatuses based, at least in part, on program-related operational circumstances and/or additional operational circumstances associated with the bead apparatuses. In one example, a bead apparatus may determine existence of a program-related operational circumstance associated with a music-related program, such as program 622. In such an example, the bead apparatus may determine occurrence of circumstance 632, such as playing of rock music and, thus, may cause display of the image associated with program 622 and circumstance 632, image 642. Image 642 may be an image of a spiked leather bracelet, a gold watch, and/or the like. Display of image 642 may be such that the image spans one or more displays of one or more bead apparatuses.

Figure 7:
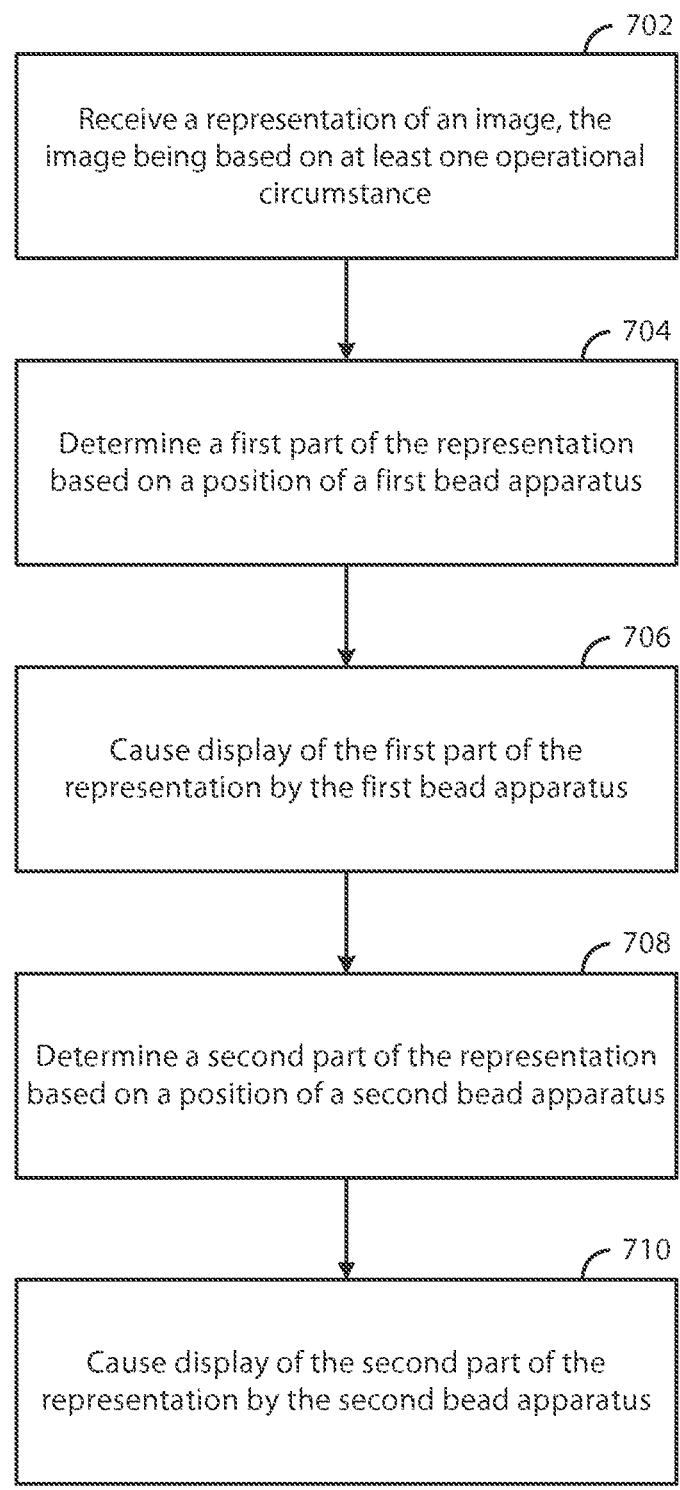
FIG. 7 is a flow diagram illustrating activities associated with causing display of a representation of an image according to at least one example embodiment.

FIG. 7 is a flow diagram illustrating activities associated with causing display of a representation of an image according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus receives a representation of an image, the image being based, at least in part, on at least one operational circumstance. The receipt, the representation, the image, and the operational circumstance may be similar as described regarding FIGS. 2A-2B, FIG. 3, and FIGS. 6A-6B.

At block 704, the apparatus determines a first part of the representation based, at least in part, on a position of a first bead apparatus. The determination, the first part of the representation, the first bead apparatus, and the position of the first bead apparatus may be similar as described regarding FIGS. 4A-4B and FIGS. 5A-5B.

At block 706, the apparatus causes display of the first part of the representation by the first bead apparatus. The causation of display by the first bead apparatus may be similar as described regarding FIGS. 4A-4B and FIGS. 5A-5B.

At block 708, the apparatus determines a second part of the representation based, at least in part, on a position of a second bead apparatus. The determination, the second part of the representation, the second bead apparatus, and the position of the second bead apparatus may be similar as described regarding FIGS. 4A-4B and FIGS. 5A-5B.

At block 710, the apparatus causes display of the second part of the representation by the second bead apparatus. The causation of display by the second bead apparatus may be similar as described regarding FIGS. 4A-4B and FIGS. 5A-5B.

Figure 8:
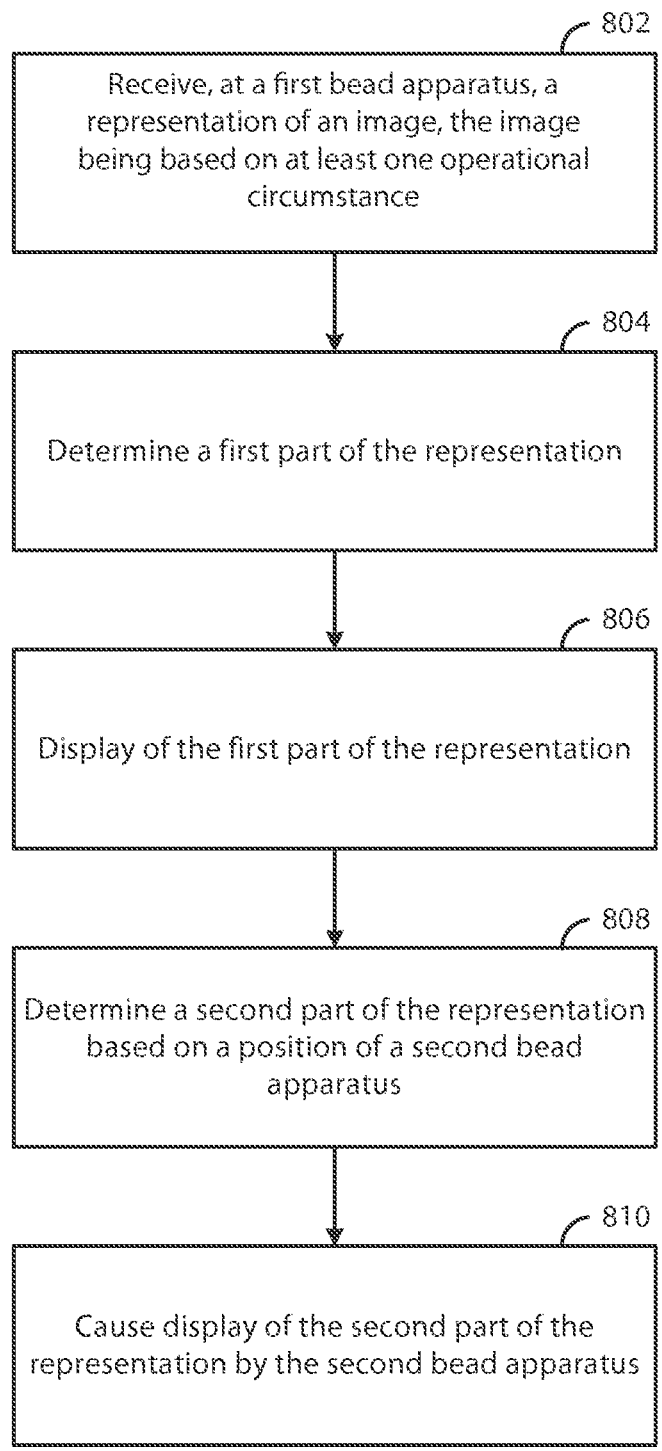
FIG. 8 is a flow diagram illustrating activities associated with causing display of a representation of an image according to at least one example embodiment.

FIG. 8 is a flow diagram illustrating activities associated with causing display of a representation of an image according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus receives, at a first bead apparatus, a representation of an image, the image being based, at least in part, on at least one operational circumstance. The receipt, the first bead apparatus, the representation, the image, and the operational circumstance may be similar as described regarding FIGS. 2A-2B, FIG. 3, and FIGS. 6A-6B.

At block 804, the apparatus determines a first part of the representation. The determination and the first part of the representation may be similar as described regarding FIGS. 4A-4B and FIGS. 5A-5B.

At block 806, the apparatus displays the first part of the representation. The causation of display may be similar as described regarding FIGS. 4A-4B and FIGS. 5A-5B.

At block 808, the apparatus determines a second part of the representation based, at least in part, on a position of a second bead apparatus. The determination, the second part of the representation, the second bead apparatus, and the position of the second bead apparatus may be similar as described regarding FIGS. 4A-4B and FIGS. 5A-5B.

At block 810, the apparatus causes display of the second part of the representation by the second bead apparatus. The causation of display by the second bead apparatus may be similar as described regarding FIGS. 4A-4B and FIGS. 5A-5B.

Figure 9:
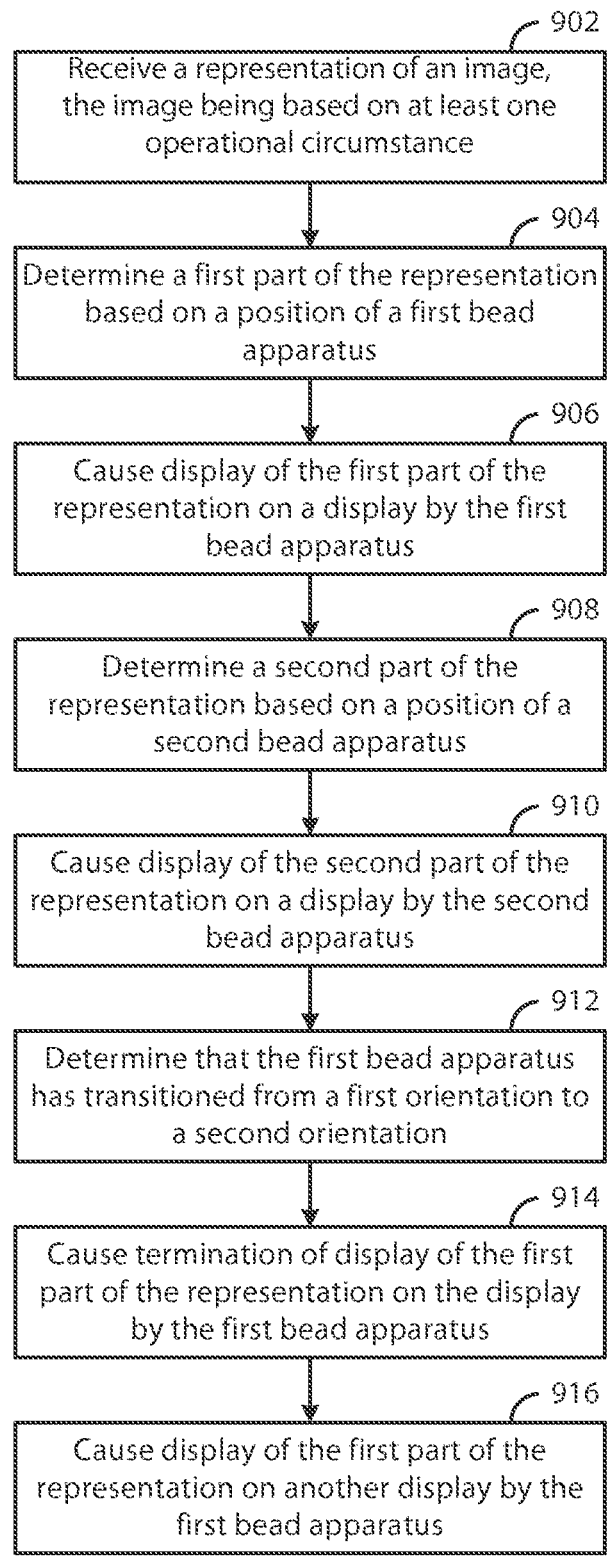
FIG. 9 is a flow diagram illustrating activities associated with causing display of a representation of an image according to at least one example embodiment.

FIG. 9 is a flow diagram illustrating activities associated with causing display of a representation of an image according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus receives a representation of an image, the image being based, at least in part, on at least one operational circumstance, similar as described regarding block 702 of FIG. 7.

At block 904, the apparatus determines a first part of the representation based, at least in part, on a position of a first bead apparatus, similar as described regarding block 704 of FIG. 7.

At block 906, the apparatus causes display of the first part of the representation by the first bead apparatus, similar as described regarding block 706 of FIG. 7.

At block 908, the apparatus determines a second part of the representation based, at least in part, on a position of a second bead apparatus, similar as described regarding block 708 of FIG. 7.

At block 910, the apparatus causes display of the second part of the representation by the second bead apparatus, similar as described regarding block 710 of FIG. 7.

At block 912, the apparatus determines that the first bead apparatus has transitioned from a first orientation to a second orientation. The determination, the transition, the first orientation, and the second orientation may be similar as described regarding FIGS. 4A-4B.

At block 914, the apparatus causes termination of display of the first part of the representation on the display by the first bead apparatus. The causation of termination of display may be similar as described regarding FIGS. 4A-4B and FIGS. 5A-5B.

At block 916, the apparatus cause display of the first part of the representation on another display by the first bead apparatus. The causation of display on another display similar as described regarding FIGS. 4A-4B and FIGS. 5A-5B.

Figure 10:
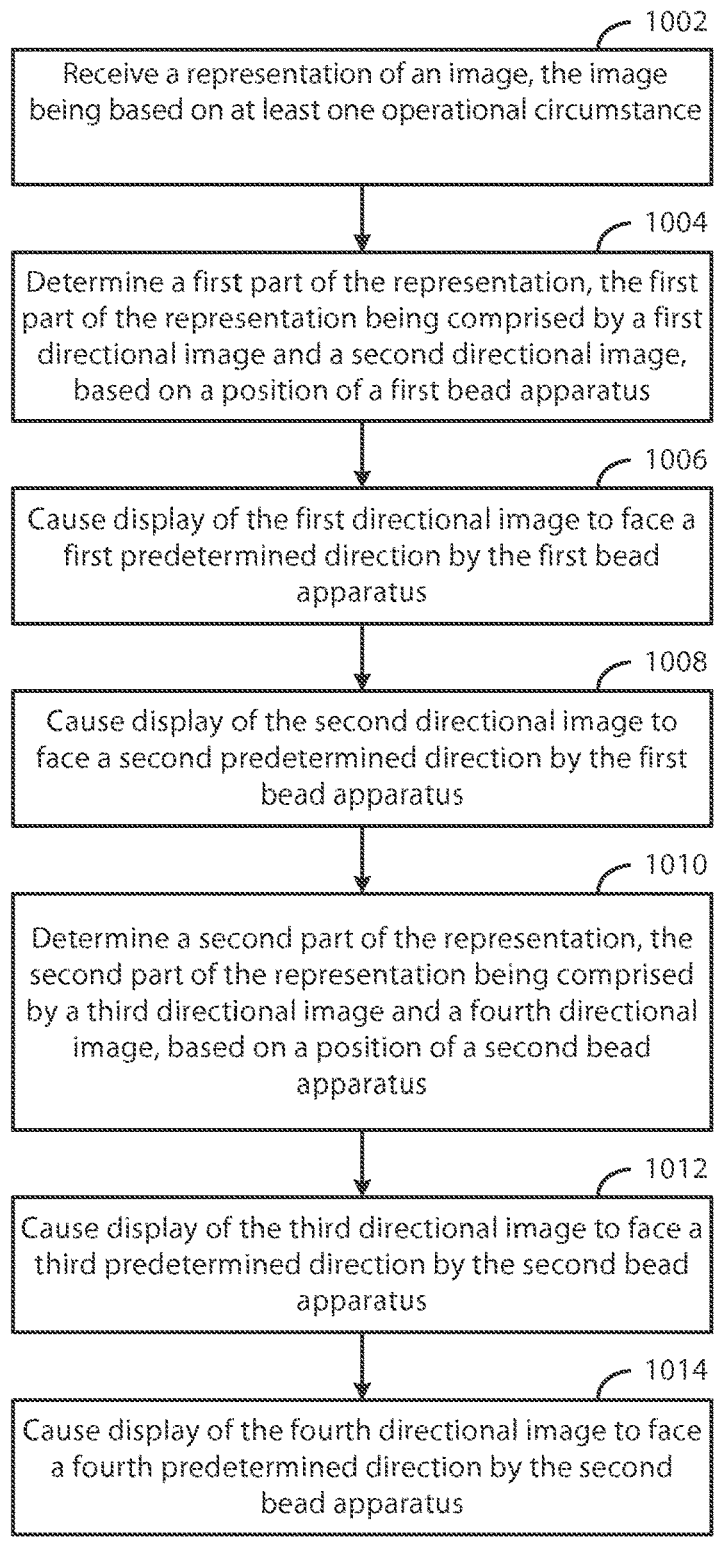
FIG. 10 is a flow diagram illustrating activities associated with causing display of a representation of an image according to at least one example embodiment.

FIG. 10 is a flow diagram illustrating activities associated with causing display of a representation of an image according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus receives a representation of an image, the image being based, at least in part, on at least one operational circumstance, similar as described regarding block 702 of FIG. 7.

At block 1004, the apparatus determines a first part of the representation based, at least in part, on a position of a first bead apparatus. In at least one example embodiment, the first part of the representation may, for example, be comprised by a first directional image and a second directional image. The determination, the first part, the first directional image, the second directional image, the representation, and the position of the first bead apparatus may be similar as described regarding FIGS. 4A-4B and FIGS. 5A-5B.

At block 1006, the apparatus causes display of the first directional image to face a first predetermined direction by the first bead apparatus. The first predetermined direction and the causation of display of the first directional image to face the first predetermined direction may be similar as described regarding FIGS. 4A-4B and FIGS. 5A-5B.

At block 1008, the apparatus causes display of the second directional image to face a second predetermined direction by the first bead apparatus. The second predetermined direction and the causation of display of the second directional image to face the second predetermined direction may be similar as described regarding FIGS. 4A-4B and FIGS. 5A-5B.

At block 1010, the apparatus determines a second part of the representation based, at least in part, on a position of a second bead apparatus. In at least one example embodiment, the second part of the representation may be comprised by a third directional image and a fourth directional image. The determination, the second part, the third directional image, the fourth directional image, the representation, and the position of the second bead apparatus may be similar as described regarding FIGS. 4A-4B and FIGS. 5A-5B.

At block 1012, the apparatus causes display of the third directional image to face a third predetermined direction by the second bead apparatus. The third predetermined direction and the causation of display of the third directional image to face the third predetermined direction may be similar as described regarding FIGS. 4A-4B and FIGS. 5A-5B.

At block 1014, the apparatus causes display of the fourth directional image to face a fourth predetermined direction by the second bead apparatus. The fourth predetermined direction and the causation of display of the fourth directional image to face the fourth predetermined direction may be similar as described regarding FIGS. 4A-4B and FIGS. 5A-5B.

Figure 11:
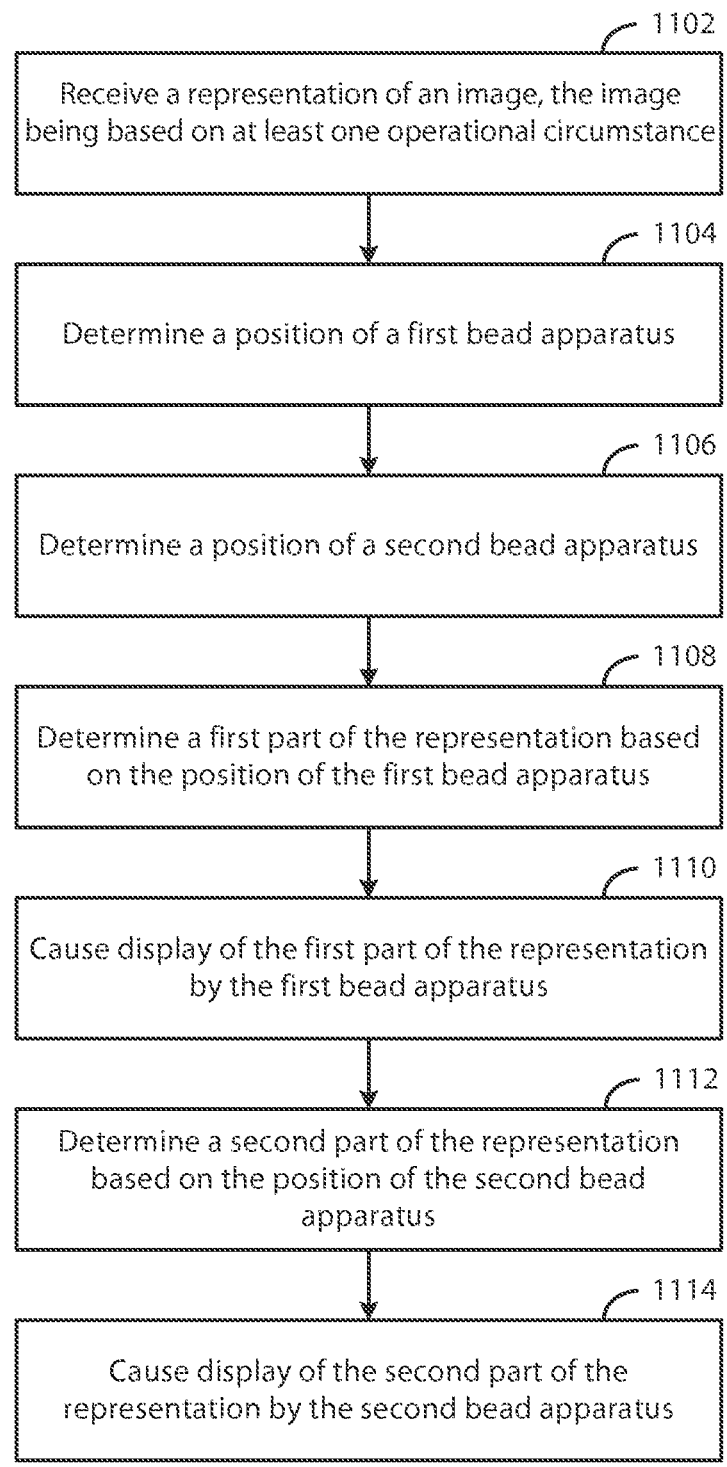
FIG. 11 is a flow diagram illustrating activities associated with causing display of a representation of an image according to at least one example embodiment.

FIG. 11 is a flow diagram illustrating activities associated with causing display of a representation of an image according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus receives a representation of an image, the image being based, at least in part, on at least one operational circumstance, similar as described regarding block 702 of FIG. 7.

At block 1104, the apparatus determines a position of a first bead apparatus. The determination, the first bead apparatus, and the position of the first bead apparatus may be similar as described regarding FIGS. 4A-4B.

At block 1106, the apparatus determines a position of a second bead apparatus. The determination, the second bead apparatus, and the position of the second bead apparatus may be similar as described regarding FIGS. 4A-4B.

At block 1108, the apparatus determines a first part of the representation based, at least in part, on the position of the first bead apparatus. The determination and the first part of the representation may be similar as described regarding FIGS. 4A-4B and FIGS. 5A-5B.

At block 1110, the apparatus causes display of the first part of the representation by the first bead apparatus, similar as described regarding block 706 of FIG. 7.

At block 1112, the apparatus determines a second part of the representation based, at least in part, on the position of the second bead apparatus. The determination and the second part of the representation may be similar as described regarding FIGS. 4A-4B and FIGS. 5A-5B.

At block 1114, the apparatus causes display of the second part of the representation by the second bead apparatus, similar as described regarding block 710 of FIG. 7.

Figure 12:
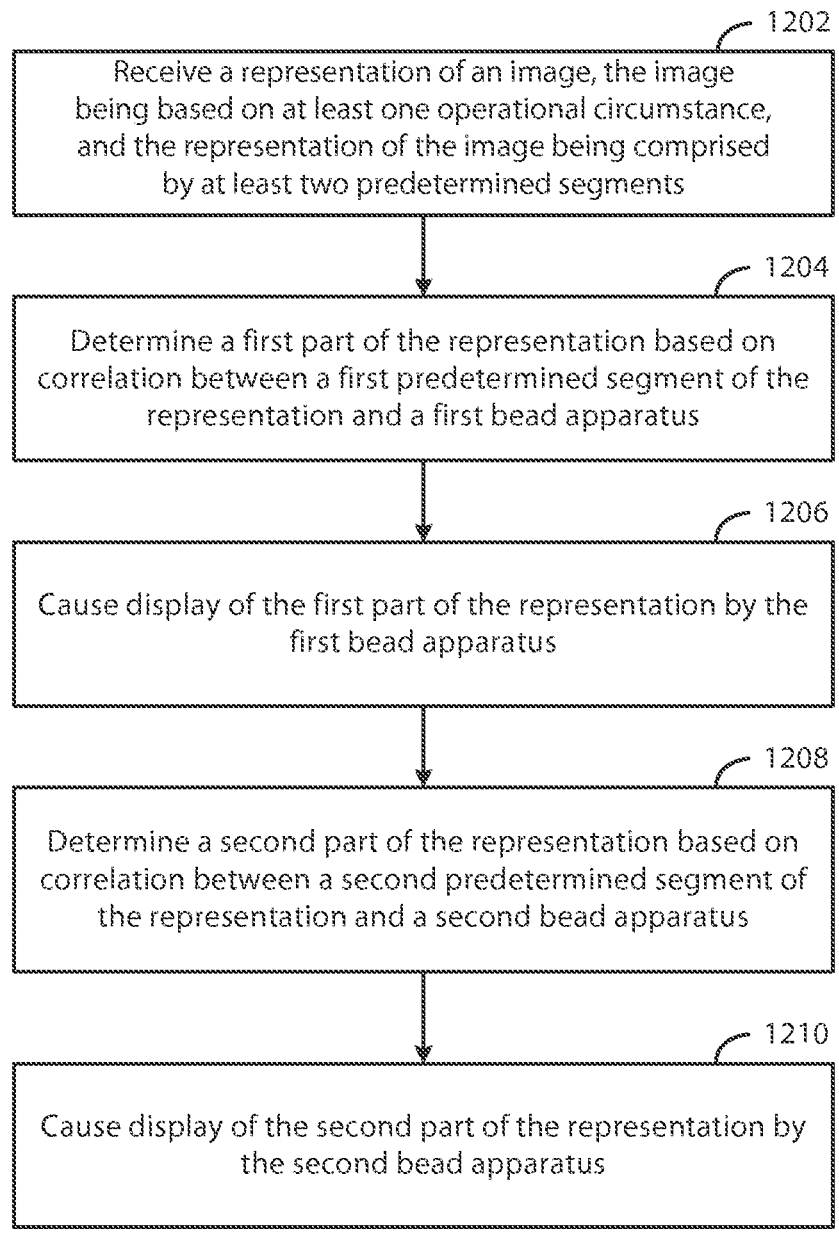
FIG. 12 is a flow diagram illustrating activities associated with causing display of a representation of an image according to at least one example embodiment.

FIG. 12 is a flow diagram illustrating activities associated with causing display of a representation of an image according to at least one example embodiment. In at least one example embodiment, there is a set of operations that corresponds with the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus receives a representation of an image, the image being based, at least in part, on at least one operational circumstance, and the representation of the image being comprised by at least two predetermined segments. The representation, the image, the operational circumstance, and the predetermined segments may be similar as described regarding FIGS. 2A-2B, FIG. 3, FIGS. 5A-5B, and FIGS. 6A-6B.

At block 1204, the apparatus determines a first part of the representation based, at least in part, on correlation between a first predetermined segment of the representation and a first bead apparatus. The determination, the first part of the representation, the first predetermined segment of the representation, the first bead apparatus, and the correlation between the first predetermined segment of the representation and the first bead apparatus may be similar as described regarding FIGS. 5A-5B.

At block 1206, the apparatus causes display of the first part of the representation by the first bead apparatus, similar as described regarding block 706 of FIG. 7.

At block 1208, the apparatus determines a second part of the representation based, at least in part, on correlation between a second predetermined segment of the representation and a second bead apparatus. The determination, the second part of the representation, the second predetermined segment of the representation, the second bead apparatus, and the correlation between the second predetermined segment of the representation and the second bead apparatus may be similar as described regarding FIGS. 5A-5B.

At block 1210, the apparatus causes display of the second part of the representation by the second bead apparatus, similar as described regarding block 710 of FIG. 7.

Figure 13:
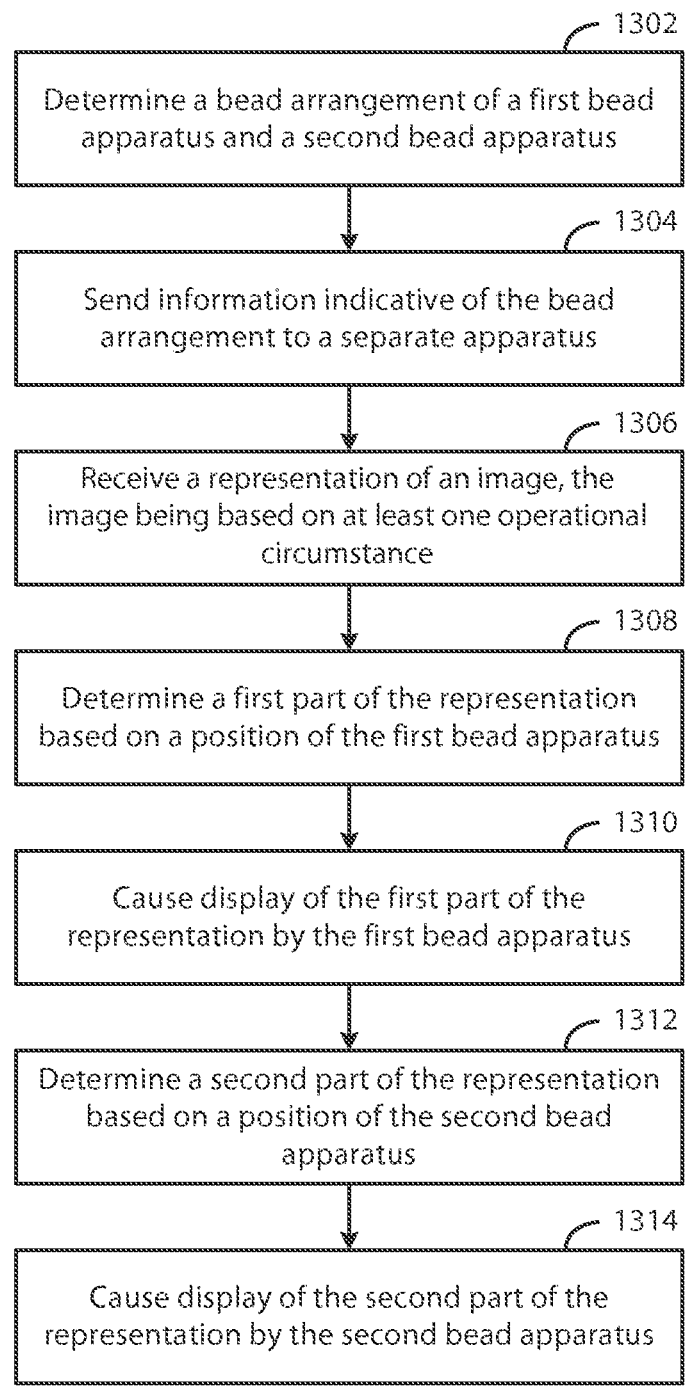
FIG. 13 is a flow diagram illustrating activities associated with causing display of a representation of an image according to at least one example embodiment.

FIG. 13 is a flow diagram illustrating activities associated with causing display of a representation of an image according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus determines a bead apparatus arrangement of a first bead apparatus and a second bead apparatus. In at least one example embodiment, the bead apparatus arrangement may be comprised by information indicative of a position of the first bead apparatus and a position of the second bead apparatus. The determination, the bead apparatus arrangement, the information indicative of the position of the first bead apparatus, and the information indicative of the position of the second bead apparatus may be similar as described regarding FIGS. 4A-4B.

At block 1304, the apparatus sends information indicative of the bead apparatus arrangement to a separate apparatus. The sending, the separate apparatus, and the information indicative of the bead apparatus arrangement may be similar as described regarding FIGS. 2A-2B and FIG. 3.

At block 1306, the apparatus receives a representation of an image, the image being based, at least in part, on at least one operational circumstance. The receipt, the representation, the image, and the operational circumstance may be similar as described regarding FIGS. 2A-2B, FIG. 3, and FIGS. 6A-6B.

At block 1308, the apparatus determines a first part of the representation based, at least in part, on a position of the first bead apparatus. The determination, the first part of the representation, and the position of the first bead apparatus may be similar as described regarding FIGS. 4A-4B and FIGS. 5A-5B.

At block 1310, the apparatus causes display of the first part of the representation by the first bead apparatus. The causation of display of the first part of the representation by the first bead apparatus may be similar as described regarding FIGS. 4A-4B and FIGS. 5A-5B.

At block 1312, the apparatus determines a second part of the representation based, at least in part, on a position of the second bead apparatus. The determination, the second part of the representation, and the position of the second bead apparatus may be similar as described regarding FIGS. 4A-4B and FIGS. 5A-5B.

At block 1314, the apparatus causes display of the second part of the representation by the second bead apparatus. The causation of display of the second part of the representation by the second bead apparatus may be similar as described regarding FIGS. 4A-4B and FIGS. 5A-5B.

Figure 14:
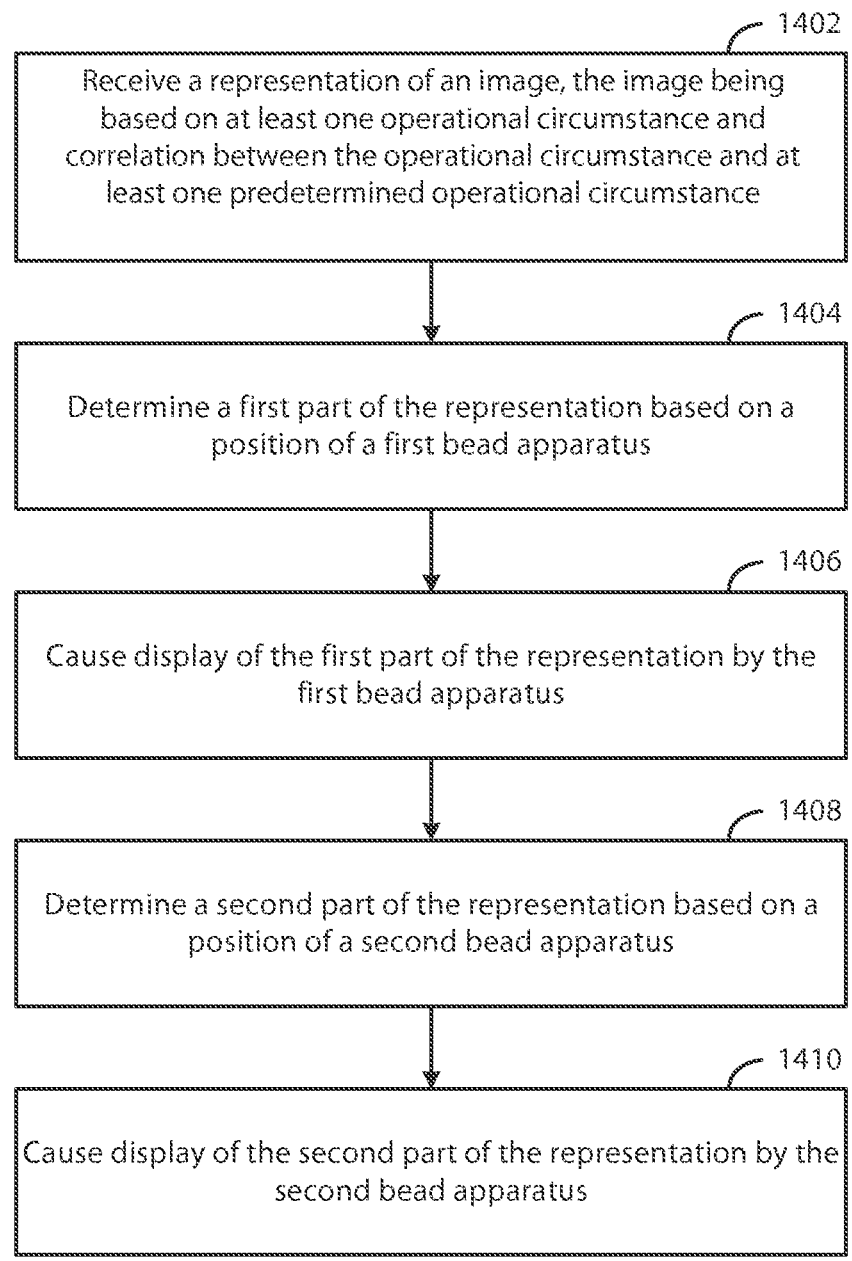
FIG. 14 is a flow diagram illustrating activities associated with causing display of a representation of an image according to at least one example embodiment.

FIG. 14 is a flow diagram illustrating activities associated with causing display of a representation of an image according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1402, the apparatus receives a representation of an image, the image being based, at least in part, on at least one operational circumstance. In at least one example embodiment, the image may be based, at least in part, on correlation between the operational circumstance and at least one predetermined operational circumstance. The representation, the image, the correlation, the operational circumstance, and the predetermined operational circumstance may be similar as described regarding FIGS. 2A-2B, FIG. 3, FIGS. 5A-5B, and FIGS. 6A-6B.

At block 1404, the apparatus determines a first part of the representation based, at least in part, on a position of a first bead apparatus. The determination, the first part of the representation, the first bead apparatus, and the position of the first bead apparatus may be similar as described regarding FIGS. 4A-4B and FIGS. 5A-5B.

At block 1406, the apparatus causes display of the first part of the representation by the first bead apparatus. The causation of display of the first part of the representation by the first bead apparatus may be similar as described regarding FIGS. 4A-4B and FIGS. 5A-5B.

At block 1408, the apparatus determines a second part of the representation based, at least in part, on a position of a second bead apparatus. The determination, the second part of the representation, the second bead apparatus, and the position of the second bead apparatus may be similar as described regarding FIGS. 4A-4B and FIGS. 5A-5B.

At block 1410, the apparatus causes display of the second part of the representation by the second bead apparatus. The causation of display of the second part of the representation by the second bead apparatus may be similar as described regarding FIGS. 4A-4B and FIGS. 5A-5B.

Figure 15:
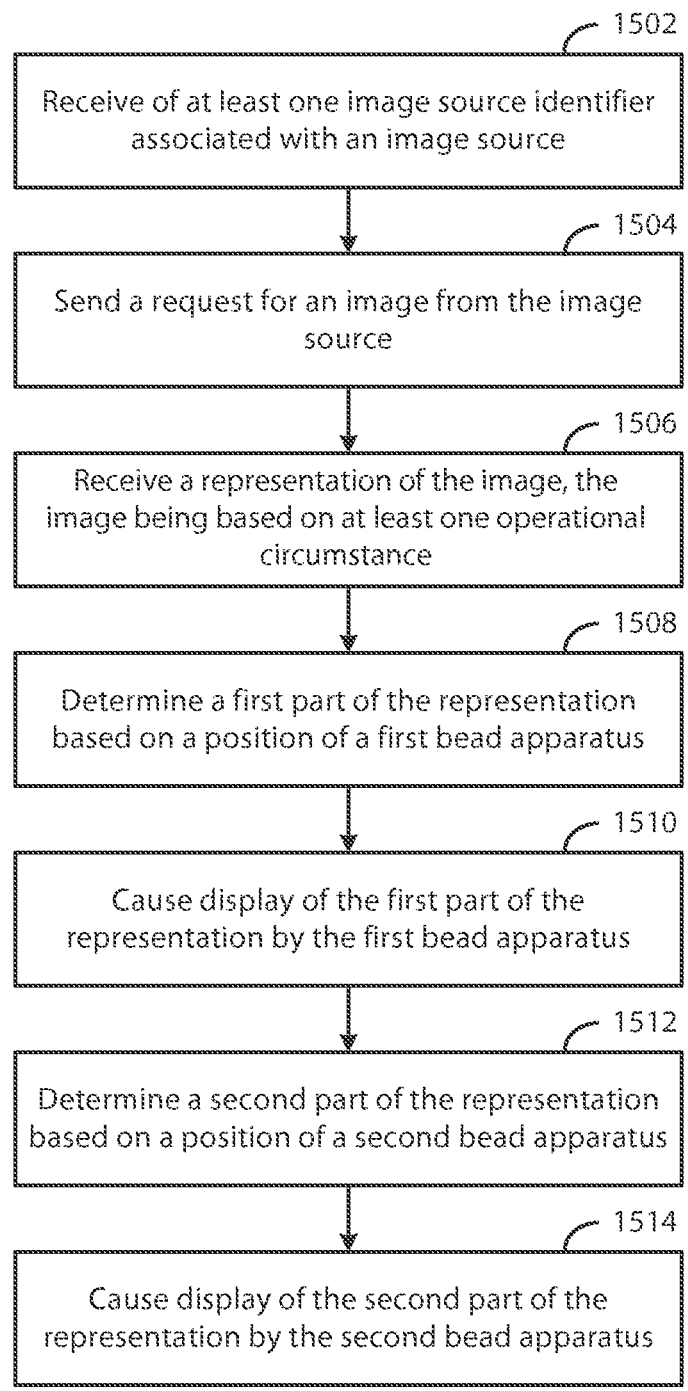
FIG. 15 is a flow diagram illustrating activities associated with causing display of a representation of an image according to at least one example embodiment.

FIG. 15 is a flow diagram illustrating activities associated with causing display of a representation of an image according to at least one example embodiment. In at least one example embodiment, there is a set of operations that corresponds with the activities of FIG. 15. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 15.

At block 1502, the apparatus receive at least one image source identifier associated with an image source. The receipt, the image source identifier, and the image source may be similar as described regarding FIGS. 6A-6B.

At block 1504, the apparatus sends a request for an image from the image source. The sending, the request, and the image may be similar as described regarding FIGS. 2A-2B, FIG. 3, and FIGS. 6A-6B.

At block 1506, the apparatus receives a representation of an image, the image being based, at least in part, on at least one operational circumstance. The receipt, the representation, the image, and the operational circumstance may be similar as described regarding FIGS. 2A-2B, FIG. 3, and FIGS. 6A-6B.

At block 1508, the apparatus determines a first part of the representation based, at least in part, on a position of a first bead apparatus. The determination, the first part of the representation, the first bead apparatus, and the position of the first bead apparatus may be similar as described regarding FIGS. 4A-4B and FIGS. 5A-5B.

At block 1510, the apparatus causes display of the first part of the representation by the first bead apparatus. The causation of display of the first part of the representation by the first bead apparatus may be similar as described regarding FIGS. 4A-4B and FIGS. 5A-5B.

At block 1512, the apparatus determines a second part of the representation based, at least in part, on a position of a second bead apparatus. The determination, the second part of the representation, the second bead apparatus, and the position of the second bead apparatus may be similar as described regarding FIGS. 4A-4B and FIGS. 5A-5B.

At block 1514, the apparatus causes display of the second part of the representation by the second bead apparatus. The causation of display of the second part of the representation by the second bead apparatus may be similar as described regarding FIGS. 4A-4B and FIGS. 5A-5B.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 706 of FIG. 7 may be performed after block 708 of FIG. 7. Furthermore, if desired, one or more of the above-described functions may be optional or may be combined. For example, block 1104 of FIG. 11 may be optional and/or combined with block 1106 of FIG. 11.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   a plurality of bead apparatus;
   at least one processor; and
   at least one memory comprising computer program code, the memory and the computer program code configured to, working with the processor, cause the apparatus to perform at least the following:

receive a representation of an image, the image being based, at least in part, on at least one operational circumstance;

determine a first part of the representation based, at least in part, on a position of a first bead apparatus of the plurality of bead apparatus;

cause display of the first part of the representation by a display of the first bead apparatus;

determine a second part of the representation based, at least in part, on a position of a second bead apparatus of the plurality of bead apparatus; and cause display of, at least a portion of, the second part of the representation by a display of the second bead apparatus, wherein the first and second parts of the representation depict different portions of a subject of the image, wherein the first part of the representation comprises a first directional image and a second directional image, and wherein causation of display of the first part of the representation comprises causation of display of the first directional image to face a first predetermined direction and causation of display of the second directional image to face a second predetermined direction, different than the first predetermined direction, and wherein the first and second directional images represent the same portion of the subject of the image from different positional perspectives with respect to the subject.

2. The apparatus of claim 1, wherein the operational circumstance identifies a program that the apparatus is executing.

3. The apparatus of claim 2, wherein the operational circumstance identifies a program associated with media content, and the image is based, at least in part, on the media content.

4. The apparatus of claim 3, wherein the media content is audio media content, and metadata associated with the media content identifies a genre of the media content, and the image is further based, at least in part, on the genre.

5. The apparatus of claim 2, wherein the operational circumstance identifies a program associated with internet shopping content, and the image is based, at least in part, on the internet shopping content.

6. The apparatus of claim 5, wherein the internet shopping content identifies an internet shopping product, and the image is further based, at least in part, on the internet shopping product.

7. The apparatus of claim 2, wherein the operational circumstance identifies a program associated with communication with a separate apparatus, and the image is based, at least in part, on the communication with the separate apparatus.

8. The apparatus of claim 7, wherein the separate apparatus is a merchant image designation apparatus, the communication with the separate apparatus identifies a merchant image identifier associated with a merchant product, and the image is further based, at least in part, on the merchant image identifier.

9. The apparatus of claim 1, wherein at least the first bead apparatus comprises first and second displays, the first directional image is displayed to the first display and the second directional image is displayed to the second display.

10. A method comprising:

receiving a representation of an image, the image being based, at least in part, on at least one operational circumstance;

determining a first part of the representation based, at least in part, on a position of a first bead apparatus of a plurality of bead apparatus;

causing display of the first part of the representation by a display of the first bead apparatus;

determining a second part of the representation based, at least in part, on a position of a second bead apparatus of the plurality of bead apparatus; and causing display of, at least a portion of, the second part of the representation by a display of the second bead apparatus, wherein the first and second parts of the representation depict different portions of a subject of the image, wherein the first part of the representation comprises a first directional image and a second directional image, and wherein causation of display of the first part of the representation comprises causation of display of the first directional image to face a first predetermined direction and causation of display of the second directional image to face a second predetermined direction, different than the first predetermined direction, and wherein the first and second directional images represent the same portion of the subject of the image from different positional perspectives with respect to the subject.

11. The method of claim 10, wherein the operational circumstance identifies a program that the apparatus is executing.

12. The method of claim 11, wherein the operational circumstance identifies a program associated with media content, and the image is based, at least in part, on the media content.

13. The method of claim 11, wherein the operational circumstance identifies a program associated with internet shopping content, and the image is based, at least in part, on the internet shopping content.

14. The method of claim 13, wherein the internet shopping content identifies an internet shopping product, and the image is further based, at least in part, on the internet shopping product.

15. The method of claim 11, wherein the operational circumstance identifies a program associated with communication with a separate apparatus, and the image is based, at least in part, on the communication with the separate apparatus.

16. The method of claim 15, wherein the separate apparatus is a merchant image designation apparatus, the communication with the separate apparatus identifies a merchant image identifier associated with a merchant product, and the image is further based, at least in part, on the merchant image identifier.

17. At least one computer-readable non-transitory medium encoded with instructions that, when executed by a processor, perform:

receiving a representation of an image, the image being based, at least in part, on at least one operational circumstance;

determining a first part of the representation based, at least in part, on a position of a first bead apparatus of a plurality of bead apparatus;

causing display of the first part of the representation by a display of the first bead apparatus;

determining a second part of the representation based, at least in part, on a position of a second bead apparatus of the plurality of bead apparatus; and causing display of, at least a portion of, the second part of the representation by a display of the second bead apparatus, wherein the first and second parts of the representation depict different portions of a subject of the image, wherein the first part of the representation comprises a first directional image and a second directional image, and wherein causation of display of the first part of the representation comprises causation of display of the first directional image to face a first predetermined direction and causation of display of the second directional image to face a second predetermined direction, different than the first predetermined direction, and wherein the first and second directional images represent the same portion of the subject of the image from different positional perspectives with respect to the subject.

18. The non-transitory medium of claim 17, wherein the operational circumstance identifies a program that the apparatus is executing.

19. The non-transitory medium of claim 18, wherein the operational circumstance identifies a program associated with media content, and the image is based, at least in part, on the media content.

20. The non-transitory medium of claim 18, wherein the operational circumstance identifies a program associated with:

internet shopping content, and the image is based, at least in part, on the internet shopping content; and communication with a separate apparatus, and the image is based, at least in part, on the communication with the separate apparatus.

* * * * *